United States Patent
Takahashi

(10) Patent No.: US 9,978,132 B2
(45) Date of Patent: May 22, 2018

(54) RADIATION IMAGE PROCESSING DEVICE, METHOD, AND PROGRAM

(71) Applicant: FUJIFILM Corporation, Tokyo (JP)

(72) Inventor: Tomoyuki Takahashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 46 days.

(21) Appl. No.: 14/868,704

(22) Filed: Sep. 29, 2015

(65) Prior Publication Data
US 2016/0093025 A1   Mar. 31, 2016

(30) Foreign Application Priority Data

Sep. 30, 2014  (JP) ................. 2014-201865

(51) Int. Cl.
*G06K 9/00* (2006.01)
*G06T 5/10* (2006.01)
*G06T 5/00* (2006.01)
*A61B 6/04* (2006.01)

(52) U.S. Cl.
CPC ............. *G06T 5/10* (2013.01); *G06T 5/008* (2013.01); *G06T 2207/10116* (2013.01); *G06T 2207/20012* (2013.01); *G06T 2207/20016* (2013.01); *G06T 2207/20064* (2013.01)

(58) Field of Classification Search
USPC ........ 382/100, 103, 106–107, 128–134, 162, 382/168, 173, 181, 209, 224, 232, 254, 382/258, 274, 276, 386, 291, 299, 305, 382/312; 378/21, 37, 62; 250/354.1
See application file for complete search history.

(56) References Cited

U.S. PATENT DOCUMENTS

| | | | |
|---|---|---|---|
| 2007/0104313 A1* | 5/2007 | Tesic .................... | A61B 5/1075 378/37 |
| 2009/0060312 A1* | 3/2009 | Kitamura ............... | G06T 5/50 382/132 |
| 2012/0014505 A1* | 1/2012 | Morita ................... | G06T 5/001 378/37 |
| 2012/0018641 A1* | 1/2012 | Watanabe ............ | A61B 6/4233 250/354.1 |

(Continued)

FOREIGN PATENT DOCUMENTS

| JP | 2013-243513 A | 12/2013 |
|---|---|---|
| JP | 2014-14655 A | 1/2014 |

*Primary Examiner* — Seyed Azarian
(74) *Attorney, Agent, or Firm* — Birch, Stewart, Kolasch & Birch, LLP

(57) ABSTRACT

Information indicating the correspondence relationship of imaging conditions, the thickness of an object, and the thickness of a specific composition included in the object, and a contrast correction amount is stored. The thickness of the object and the thickness of a specific composition included in the object of each unit region having one or two or more pixels of the radiation image are acquired. For each unit region of the radiation image, a contrast correction amount corresponding to a combination of the imaging conditions, the thickness of the object acquired for the unit region, and the thickness of the specific composition is acquired with reference to the stored information indicating the correspondence relationship, and contrast correction is performed using the acquired contrast correction amount.

8 Claims, 12 Drawing Sheets

(56) References Cited

U.S. PATENT DOCUMENTS

2012/0114098 A1* 5/2012 Mikami ............... A61B 6/4233
                                                    378/62
2013/0310693 A1   11/2013 Tsuruno
2015/0093013 A1    4/2015 Morita

* cited by examiner

RADIATION IMAGE PROCESSING DEVICE, METHOD, AND PROGRAM

CROSS-REFERENCE TO RELATED APPLICATIONS

The present application claims priority under 35 U.S.C. § 119 to Japanese Patent Application No. 2014-201865, filed on Sep. 30, 2014, all of which are hereby expressly incorporated by reference into the present application.

BACKGROUND OF THE INVENTION

1. Field of the Invention

The present invention relates to a radiation image processing device, a method, and a non-transitory computer-readable recording medium storing a program which perform contrast correction on a radiation image.

2. Description of the Related Art

Various methods for improving contrast of a radiation image acquired by exposing an object to radiation have been hitherto suggested. For example, JP2013-243513 suggests a method in which, as shown in FIG. 14, a radiation image of a chest is divided into five anatomical regions of regions A1 of a lung field, a mediastinal portion A2, an abdominal portion A3, and a portion A4 other than these portions, and a contrast correction amount is set for each divided region. Furthermore, JP2014-14655A suggests a method in which a radiation image of a breast is divided into five regions according to a fat rate or is divided into several comparatively great block regions, and a contrast correction amount according to the fat rate is set for each divided region.

SUMMARY OF THE INVENTION

However, in JP2013-243513 and JP2014-14655A, the radiation image is divided into several comparatively wide regions, and uniform contrast correction is performed in each divided region; therefore, even when there are a plurality of partial regions having different compositions of the object in the region, for each of the partial regions having different compositions, different contrast correction matching the regions cannot be performed, and there is a problem in that sufficient image quality is not obtained over the entire image. For example, in JP2013-243513, each of the right and left lung field regions in the radiation image of the chest is divided as one region, and uniform contrast correction is performed in the whole of each divided region; therefore, for each of a rib region and an intercostal region in the lung field region, different contrast correction matching the region cannot be performed.

An object of the invention is to provide a radiation image processing device, a method, and a non-transitory computer-readable recording medium storing a program capable of performing, for each portion of a radiation image, contrast correction matching the portion and securing sufficient image quality over the entire image in consideration of the above-described situation.

A radiation image processing device of the invention includes a correspondence relationship storage unit that stores information indicating the correspondence relationship of at least one imaging condition at the time of capturing a radiation image, the thickness of an object in a radiation exposure direction, the thickness of a specific composition in the radiation exposure direction included in the object, and a contrast correction amount, an object thickness acquisition unit that, in a radiation image captured by exposing the object to radiation, for each unit region having one or two or more pixels, acquires the thickness of the object corresponding to the unit region, a composition thickness acquisition unit that, in the radiation image, for each unit region of the radiation image, acquires the thickness of the specific composition included in the object corresponding to the unit region, a correction amount acquisition unit that, for each unit region of the radiation image, acquires a contrast correction amount corresponding to a combination of at least one imaging condition at the time of capturing the radiation image, the acquired thickness of the object of the unit region, and the thickness of the specific composition with reference to the stored information indicating the correspondence relationship, and a correction processing unit that, for each unit region of the radiation image, performs contrast correction using the acquired contrast correction amount of the unit region.

Here, as the imaging conditions at the time of imaging, for example, a tube voltage, an exposure dose, the type of a radiation source, the presence or absence of a grid, the classification of a grid, the presence or absence or the classification of an addition filter, and the like are given.

The term "the thickness of the object corresponding to the unit region" means a value representing the thickness of the object corresponding to the unit region, and one value determined based on information relating to the thickness of the object at one point or each of a plurality of points on the unit region.

The radiation image processing device of the invention may further include a first estimated thickness acquisition unit that, for each unit region of the radiation image, determines a value obtained by subtracting the distance between a radiation source and the object corresponding to the unit region from the distance between the radiation source and a radiation detector as a first estimated thickness of the object corresponding to the unit region, a second estimated thickness acquisition unit that, for each unit region of the radiation image, determines a value obtained by converting a pixel value representing the unit region to the thickness of the object using a conversion function set in advance as a second estimated thickness of the object corresponding to the unit region, and a second correspondence relationship storage unit that stores information indicating the second correspondence relationship of at least one imaging condition at the time of capturing a radiation image, the thickness of the object, a value obtained by subtracting a value obtained by converting a pixel value of a pixel with the object imaged on the radiation image to the thickness of the object by the conversion function from the value obtained by subtracting the distance between the radiation source and the object from the distance between the radiation source and the radiation detector, and the thickness of the specific composition included in the object, for each unit region of the radiation image, the object thickness acquisition unit may acquire one of the determined first estimated thickness and second estimated thickness as the thickness of the object corresponding to the unit region, and, for each unit region of the radiation image, the composition thickness acquisition unit may acquire the thickness of the specific composition corresponding to a combination of at least one imaging condition at the time of capturing the radiation image, the acquired thickness of the object of the unit region, and a value obtained by subtracting the second estimated thickness from the first estimated thickness determined for the unit region with reference to the stored information indicating the second correspondence relationship.

Here, as "the distance between the radiation source and the radiation detector" used when determining the first estimated thickness of the object for each unit region, the distance between the radiation source and the radiation detector along the radiation exposure line passing through the unit region may be used. Alternatively, the distance between the radiation source and the radiation detector along the optical axis of the radiation source may be used.

As "the distance between the radiation source and the object corresponding to the unit region" used when determining the first estimated thickness of the object for each unit region, when the unit region is a region having one pixel, the distance between the radiation source and the object surface along one radiation exposure line passing through the unit region may be used, and when the unit region is a region having two or more pixels, the distance between the radiation source and the object surface along one radiation exposure line passing through the unit region or a representative value (for example, an average value, a median value, a mode value, a maximum value, a minimum value, or the like) of the distance between the radiation source and the object surface along each of a plurality of radiation exposure lines passing through different positions in the unit region may be used.

As "the pixel value representing the unit region", when the unit region is a region having one pixel, the pixel value of one pixel in the unit region may be used, and when the unit region is a region having two or more pixels, the pixel value of one pixel in the unit region or a representative value (for example, an average value, a median value, a mode value, a maximum value, a minimum value, or the like) of the pixel values of a plurality of pixels in the unit region may be used.

The radiation image processing device of the invention may further include a third correspondence relationship storage unit that stores information indicating the third correspondence relationship of at least one imaging condition at the time of capturing the radiation image, the thickness of the object, the difference in the thickness of the object estimated by the radiation images before and after smoothing, and the thickness of the specific composition included in the object, and a smoothed object thickness acquisition unit that smoothes the distribution of the thickness of the object acquired for each unit region by the object thickness acquisition unit to determine the thickness of the object of each unit region after smoothing, for each unit region of the radiation image, the object thickness acquisition unit may acquire a value obtained by converting a pixel value representing the unit region to the thickness of the object by a conversion function set in advance as the thickness of the object corresponding to the unit region, and for each unit region of the radiation image, the composition thickness acquisition unit may acquire the thickness of the specific composition corresponding to a combination of at least one imaging condition at the time of capturing the radiation image, one of the thickness of the object in the unit region acquired by the object thickness acquisition unit and the thickness of the object in the unit region after smoothing determined by the smoothed object thickness acquisition unit, and a value obtained by subtracting the thickness of the object in the unit region after smoothing determined by the smoothed object thickness acquisition unit from the thickness of the object in the unit region acquired by the object thickness acquisition unit with reference to the stored information indicating the third correspondence relationship.

The radiation image processing device of the invention may further include a fourth correspondence relationship storage unit that stores information indicating the fourth correspondence relationship of at least one imaging condition at the time of capturing the radiation image, the thickness of the object, the difference in the thickness of the object estimated by the radiation images with different resolution, and the thickness of the specific composition included in the object, and a low-resolution object thickness acquisition unit that generates a low-resolution image with lower resolution than the radiation image from the radiation image, and for each corresponding unit region corresponding to each unit region in the generated low-resolution image, acquires a value obtained by converting a pixel value representing the corresponding unit region to the thickness of the object by a conversion function set in advance as the thickness of the object corresponding to the corresponding unit region, for each unit region of the radiation image, the object thickness acquisition unit may acquire a value obtained by converting a pixel value representing the unit region to the thickness of the object by a conversion function set in advance as the thickness of the object corresponding to the unit region, and, for each unit region of the radiation image, the composition thickness acquisition unit may acquire the thickness of the specific composition corresponding to a combination of at least one imaging condition at the time of capturing the radiation image, one of the thickness of the object in the unit region acquired by the object thickness acquisition unit and the thickness of the object in the corresponding unit region corresponding to the unit region acquired by the low-resolution object thickness acquisition unit, and a value obtained by subtracting the thickness of the object in the corresponding unit region corresponding to the unit region acquired by the low-resolution object thickness acquisition unit from the thickness of the object in the unit region acquired by the object thickness acquisition unit with reference to the stored information indicating the fourth correspondence relationship.

The radiation image processing device of the invention may further include a first estimated thickness acquisition unit that, for each unit region of the radiation image, determines a value obtained by subtracting the distance between a radiation source and the object corresponding to the unit region from the distance between the radiation source and a radiation detector as a first estimated thickness of the object corresponding to the unit region, a second estimated thickness acquisition unit that, for each unit region of the radiation image, determines a value obtained by converting a pixel value representing the unit region to the thickness of the object by a conversion function set in advance as a second estimated thickness of the object corresponding to the unit region, a second correspondence relationship storage unit that stores information indicating the second correspondence relationship of at least one imaging condition at the time of capturing the radiation image, the thickness of the object, a value obtained by subtracting a value obtained by converting a pixel value of a pixel with the object imaged on the radiation image to the thickness of the object by the conversion function from the thickness of the object, and the thickness of the specific composition included in the object, a third correspondence relationship storage unit that stores information indicating the third correspondence relationship of at least one imaging condition at the time of capturing the radiation image, the thickness of the object, the difference in the thickness of the object estimated by the radiation images before and after smoothing, and the thickness of the specific composition included in the object, a region specification unit that, in the radiation image, specifies an air containing region as a region with an object including an air region imaged, and a smoothed object thickness acquisition unit that smoothes the distribution of the thickness of the object acquired for each unit region by the object thickness acquisition unit to determine the thickness of the object of each unit region after smoothing, for each unit region of the radiation image, the object thickness acquisition unit may acquire one of the determined first estimated thickness and second estimated thickness as the thickness of the object corresponding to the unit region, and, in the specified air containing region and a region other than the specified air containing region, the composition thickness acquisition unit may acquire the thickness of the specific composition in the respective regions by two different methods as described below.

(1) In the specified air containing region, for each unit region, the composition thickness acquisition unit may acquire the thickness of the specific composition corresponding to a combination of at least one imaging condition at the time of capturing the radiation image, one of the thickness of the object in the unit region acquired by the object thickness acquisition unit and the thickness of the object in the unit region after smoothing determined by the smoothed object thickness acquisition unit, and a value obtained by subtracting the thickness of the object in the unit region after smoothing obtained by smoothing the distribution of the acquired thickness of the object from the thickness of the object before smoothing with reference to the stored information indicating the third correspondence relationship, and (2) in a region other than the specified air containing region, for each unit region, the composition thickness acquisition unit may acquire the thickness of the specific composition corresponding to a combination of at least one imaging condition at the time of capturing the radiation image, the thickness of the object acquired for the unit region by the object thickness acquisition unit, and a value obtained by subtracting the thickness of the object in the unit region after smoothing determined by the smoothed object thickness acquisition unit from the thickness of the object in the unit region acquired by the object thickness acquisition unit with reference to the stored information indicating the second correspondence relationship.

The radiation image processing device of the invention may further include a first estimated thickness acquisition unit that, for each unit region of the radiation image, determines a value obtained by subtracting the distance between a radiation source and the object corresponding to the unit region from the distance between the radiation source and a radiation detector as a first estimated thickness of the object corresponding to the unit region, a second estimated thickness acquisition unit that, for each unit region of the radiation image, determines a value obtained by converting a pixel value representing the unit region to the thickness of the object by a conversion function set in advance as a second estimated thickness of the object corresponding to the unit region, a second correspondence relationship storage unit that stores information indicating the second correspondence relationship of at least one imaging condition at the time of capturing the radiation image, the thickness of the object, a value obtained by subtracting a value obtained by converting a pixel value of a pixel with the object imaged on the radiation image to the thickness of the object by the conversion function from the thickness of the object, and the thickness of the specific composition included in the object, a fourth correspondence relationship storage unit that stores information indicating the fourth correspondence relationship of at least one imaging condition at the time of capturing the radiation image, the thickness of the object, the difference in the thickness of the object estimated by the radiation images with different resolution, and the thickness of the specific composition included in the object, a region specification unit that, in the radiation image, specifies an air containing region as a region with an object including an air region imaged, and a low-resolution object thickness acquisition unit that generates a low-resolution image with lower resolution than the radiation image from the radiation image, and for each corresponding unit region corresponding to each unit region in the generated low-resolution image, acquires a value obtained by converting a pixel value representing the corresponding unit region to the thickness of the object by the conversion function as the thickness of the object corresponding to the corresponding unit region, for each unit region of the radiation image, the object thickness acquisition unit may acquire one of the determined first estimated thickness and second estimated thickness as the thickness of the object corresponding to the unit region, and, in the specified air containing region and a region other than the specified air containing region, the composition thickness acquisition unit may acquire the thickness of the specific composition in the respective regions by two different methods as described below.

(1) In the specified air containing region, for each unit region, the composition thickness acquisition unit may acquire the thickness of the specific composition corresponding to a combination of at least one imaging condition at the time of capturing the radiation image, one of the thickness of the object in the unit region acquired by the object thickness acquisition unit and the thickness of the object in the corresponding unit region corresponding to the unit region acquired by the low-resolution object thickness acquisition unit, and a value obtained by subtracting the thickness of the object in the corresponding unit region corresponding to the unit region acquired by the low-resolution object thickness acquisition unit from the thickness of the object in the unit region acquired by the object thickness acquisition unit with reference to the stored information indicating the fourth correspondence relationship, and (2) in a region other than the specified air containing region, for each unit region, the composition thickness acquisition unit may acquire the thickness of the specific composition corresponding to a combination of at least one imaging condition at the time of capturing the radiation image, the acquired thickness of the object of the unit region, and a value obtained by subtracting the second estimated thickness from the first estimated thickness determined for the unit region with reference to the stored information indicating the second correspondence relationship.

The radiation image processing device of the invention may further include a frequency decomposition unit that performs frequency decomposition of the radiation image to generate a band image representing a frequency component of each of a plurality of frequency bands, the correspondence relationship storage unit may store information indicating the correspondence relationship of at least one imaging condition at the time of capturing the radiation image, the thickness of the object, the thickness of a specific composition included in the object, and a contrast correction amount to each band image generated by frequency-resolving the radiation image, for each region corresponding to the unit region of each generated band image, the correction amount acquisition unit may acquire a contrast correction amount to the band image corresponding to a combination of at least one imaging condition at the time of capturing the radiation image, the acquired thickness of the object for the unit region, and the thickness of a specific composition with reference to the stored information indicating the correspondence relationship, and for each region corresponding to the unit region of each generated band image, the correction processing unit may perform contrast correction using the acquired contrast correction amount for the region and synthesizes all band images after correction to generate a processed radiation image.

A radiation image processing method of the invention includes a step of acquiring information indicating the correspondence relationship from a correspondence relationship storage unit that stores information indicating the correspondence relationship of at least one imaging condition at the time of capturing a radiation image, the thickness of an object in a radiation exposure direction, the thickness of a specific composition in the radiation exposure direction included in the object, and a contrast correction amount, a step of, in a radiation image captured by exposing the object to radiation, for each unit region having one or two or more pixels, acquiring the thickness of the object corresponding to the unit region, a step of, in the radiation image, for each unit region of the radiation image, acquiring the thickness of the specific composition included in the object corresponding to the unit region, a step of, for each unit region of the radiation image, acquiring a contrast correction amount corresponding to a combination of at least one imaging condition at the time of capturing the radiation image, the acquired thickness of the object of the unit region, and the thickness of the specific composition with reference to the stored information indicating the correspondence relationship, and a step of, for each unit region of the radiation image, performing contrast correction using the acquired contrast correction amount of the unit region.

There is provided a non-transitory computer-readable recording medium storing a radiation image processing program of the invention which causes a computer to function as a correspondence relationship storage unit which stores information indicating the correspondence relationship of at least one imaging condition at the time of capturing the radiation image, the thickness of an object in a radiation exposure direction, the thickness of a specific composition in the radiation exposure direction included in the object, and a contrast correction amount, an object thickness acquisition unit which, in a radiation image captured by exposing the object to radiation, for each unit region having one or two or more pixels, acquires the thickness of the object corresponding to the unit region, a composition thickness acquisition unit which, in the radiation image, for each unit region of the radiation image, acquires the thickness of the specific composition included in the object corresponding to the unit region, a correction amount acquisition unit which, for each unit region of the radiation image, acquires a contrast correction amount corresponding to a combination of at least one imaging condition at the time of capturing the radiation image, the acquired thickness of the object of the unit region, and the thickness of the specific composition with reference to the stored information indicating the correspondence relationship, and a correction processing unit which, for each unit region of the radiation image, performs contrast correction using the acquired contrast correction amount of the unit region.

The radiation image processing program of the invention normally has a plurality of program modules, and the function of each unit is realized by one program module or a plurality of program modules. The program module group is recorded on a recording medium, such as a compact disc-read only memory (CD-ROM) or a digital versatile disc (DVD), or is recorded on a storage attached to a server computer or a network storage in a downloadable state and provided to a user.

According to the radiation image processing device, the method, and the non-transitory computer-readable recording medium storing the program of the invention, information indicating the correspondence relationship of at least one imaging condition at the time of capturing the radiation image, the thickness of the object in the radiation exposure direction, the thickness of the specific composition in the radiation exposure direction included in the object, and the contrast correction amount is stored, in the radiation image captured by exposing the object to radiation, for each unit region having one or two or more pixels, the thickness of the object corresponding to the unit region is acquired, in the radiation image, for each unit region of the radiation image, the thickness of the specific composition included in the object corresponding to the unit region is acquired, for each unit region of the radiation image, the contrast correction amount corresponding to a combination of at least one imaging condition at the time of capturing the radiation image, the thickness of the object acquired for the unit region, and the thickness of the specific composition is acquired with reference to the stored information indicating the correspondence relationship, and for each unit region of the radiation image, contrast correction is performed using the contrast correction amount acquired for the unit region. Therefore, in the radiation image, for each unit region as a sufficiently small region, contrast correction can be performed in consideration of the thickness of the specific composition included in the object corresponding to the region, and sufficient image quality can be secured over the entire image. For example, in a radiation image of a chest, different contrast correction matching each of a rib region and an intercostal region in a lung field region can be performed.

DESCRIPTION OF THE PREFERRED EMBODIMENTS

Figure 1:
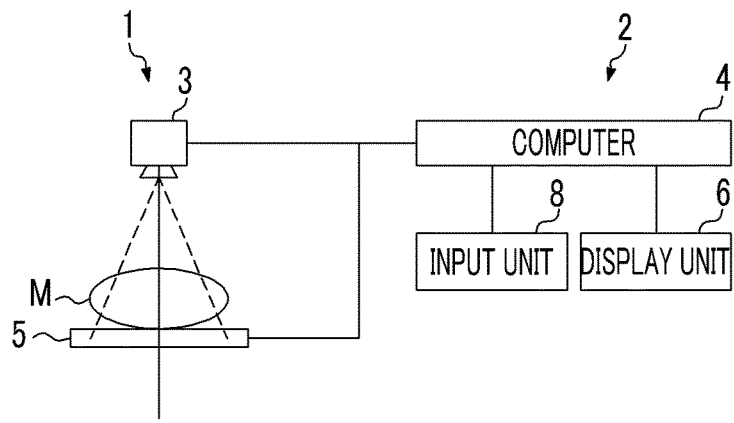
FIG. 1 is a diagram showing the schematic configuration of a radiation imaging system provided with an embodiment of the invention.

Hereinafter, an embodiment of the invention will be described referring to the drawings. FIG. 1 is a schematic block diagram showing the configuration of a radiation imaging system to which a radiation image processing device according to a first embodiment of the invention is applied. A radiation image processing system of this embodiment is a system for performing contrast correction on a radiation image of an object, and as shown in FIG. 1, includes an imaging device 1, and a control device 2 including a radiation image processing device of this embodiment.

The imaging device 1 includes an X-ray source 3 which exposes an object M to X-rays, and a radiation detector 5 which detects X-rays transmitted through the object M to acquire a radiation image of the object M.

For the radiation detector 5, a so-called direct radiation detector which can repeatedly record and read a radiation image and directly receives exposure of radiation to generate an electric charge may be used, or a so-called indirect radiation detector which converts radiation to visible light once and converts visible light to an electric charge signal may be used. As a system for reading a radiation image signal, although a so-called TFT reading system in which a radiation image signal is read by turning on or off a thin film transistor (TFT) switch, or a so-called optical reading system in which a radiation image signal is read by exposing read light is desirably used, the invention is not limited thereto, and other systems may be used.

The radiation detector 5 is connected to the control device 2 through a cable or the like or in a wireless manner. The control device 2 is provided with a circuit board on which a detector controller which controls reading of an electric charge signal from the radiation detector 5, a charge amplifier which converts the electric charge signal read from the radiation detector 5 to a voltage signal, a correlated double sampling circuit which samples the voltage signal output from the charge amplifier, an AD conversion unit which converts the voltage signal to a digital signal, and the like are provided.

The control device 2 includes a computer 4, and a display unit 6 and an input unit 8 connected to the computer 4.

Figure 2:
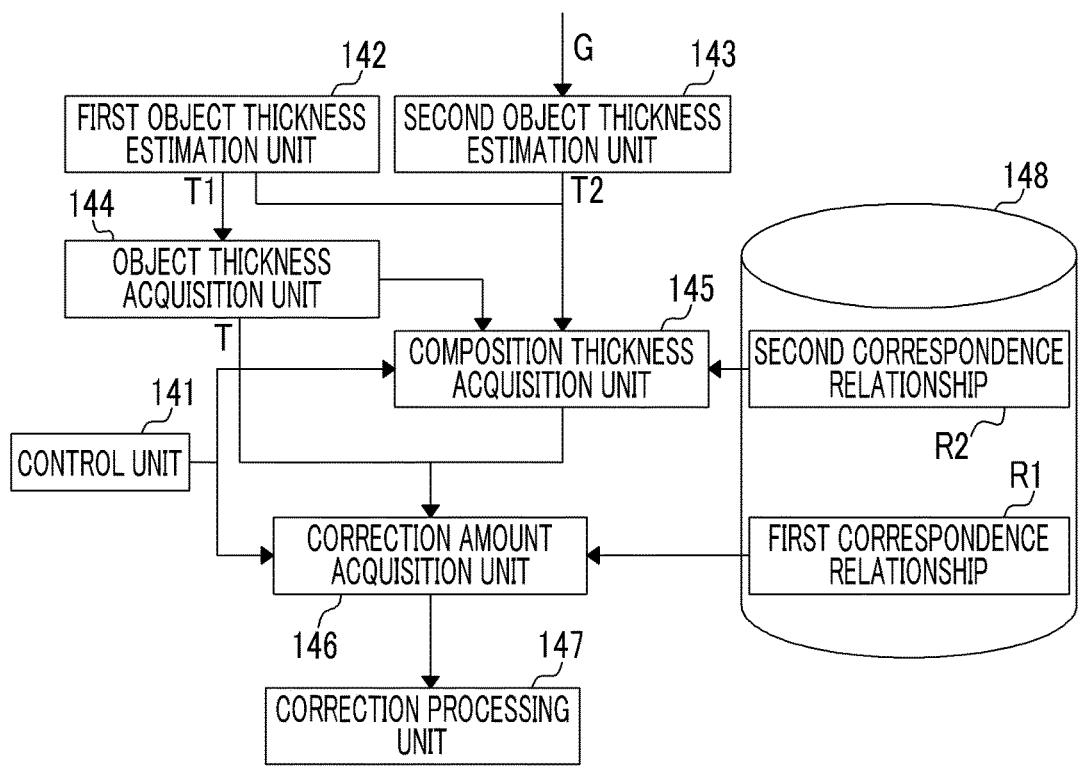
FIG. 2 is a block diagram showing the schematic configuration of the inside of a computer of a radiation imaging system in a first embodiment.

The computer 4 includes a central processing unit (CPU), a semiconductor memory, a communication interface, a storage device, such as a hard disk or a solid state device (SSD), and the like, and a control unit 141, a first object thickness estimation unit 142, a second object thickness estimation unit 143, an object thickness acquisition unit 144, a composition thickness acquisition unit 145, a correction amount acquisition unit 146, a correction processing unit 147, and a storage unit 148 shown in FIG. 2 are constituted of these kinds of hardware. The first object thickness estimation unit 142, the second object thickness estimation unit 143, the object thickness acquisition unit 144, the composition thickness acquisition unit 145, the correction amount acquisition unit 146, the correction processing unit 147, and the storage unit 148 constitute a radiation image processing device of the invention.

The control unit 141 outputs a predetermined control signal to the X-ray source 3 and the radiation detector 5 to control imaging, or controls the whole processing which is performed in the computer 4.

In a radiation image G acquired by imaging, for each unit region (hereinafter, simply referred to as a "unit region") where one or two or more pixels are included and a range of a maximum width of less than 2 cm of the object M in a surface orthogonal to a radiation exposure direction is imaged, the first object thickness estimation unit 142 determines a value obtained by subtracting the distance between the X-ray source 3 and the surface of the object corresponding to the unit region from the distance between the X-ray source 3 and the radiation detector 5 as a first estimated thickness of the object corresponding to the unit region. With this, a first estimated thickness distribution T1 of the object M of each unit region is obtained.

At this time, as the distance between the X-ray source 3 and the radiation detector 5, the distance between the X-ray source 3 and the radiation detector 5 along a radiation exposure line passing through the unit region, or the distance between the X-ray source 3 and the radiation detector 5 along the optical axis of the X-ray source 3 is used. The distance between the X-ray source 3 and the radiation detector 5 along the radiation exposure line passing through the unit region or the optical axis can be measured by an ultrasonic range finder attached to an X-ray exposure unit.

As the distance between the X-ray source 3 and the object surface corresponding to the unit region, when the unit region is a region having one pixel, the distance between the X-ray source 3 and the object surface along one radiation exposure line passing through the unit region is used, and when the unit region is a region having two or more pixels, the distance between the X-ray source 3 and the object surface along one radiation exposure line passing through the unit region or a representative value (for example, an average value, a median value, a mode value, a maximum value, a minimum value, or the like) of the distance between the X-ray source 3 and the object surface along each of a plurality of radiation exposure lines passing through different positions in the unit region is used. The distance between X-ray source 3 and the object surface 5 along a radiation exposure line passing through a predetermined position on the unit region can be measured by an ultrasonic range finder attached to an X-ray exposure unit.

For each unit region of the radiation image the second object thickness estimation unit 143 determines a value obtained by converting a pixel value representing the unit region to the thickness of the object by a predetermined conversion function as a second estimated thickness of the object corresponding to the unit region. With this, a second estimated thickness distribution T2 of the object M of each unit region is obtained. At this time, as the conversion function, it is assumed that the entire object has a uniform composition and a luminance distribution in the radiation image G substantially matches the distribution of the thickness of the object, and a conversion function which converts the pixel value of the radiation image G to the thickness by a radiation attenuation coefficient value is used. For example, when the object is a human body, it is assumed that the entire object is constituted of a soft tissue, and the pixel value of the radiation image G is converted to the thickness of the object. With this, in an image portion where an object including a bone is imaged, the object thickness which is greater than the actual thickness is estimated; conversely, in an image portion where an object including an air region is imaged, the object thickness which is smaller than the actual thickness is estimated.

As the pixel value representing the unit region, when the unit region is a region having one pixel, the pixel value of one pixel in the unit region is used, and when the unit region is a region having two or more pixels, the pixel value of one pixel in the unit region or a representative value (for example, an average value, a median value, a mode value, a maximum value, a minimum value, or the like) of the pixel values of a plurality of pixels in the unit region is used.

In the radiation image the object thickness acquisition unit 144 acquires the thickness of the object at each position of the radiation image. For example, for each unit region of the radiation image one of the determined first estimated thickness and second estimated thickness is acquired as the thickness of the object in the direction of exposure of the radiation corresponding to the unit region. With this, the thickness distribution T of the object of each unit region is obtained. The acquisition of one of the first estimated thickness and the second estimated thickness as the thickness of the object can be set in advance. In the following description, a case where the first estimated thickness is acquired as the thickness of the object M will be described.

For each unit region of the radiation image the composition thickness acquisition unit 145 acquires the thickness of a specific composition included in the object corresponding to the unit region. For example, when the object M is a human body, the thickness of a bone, a soft tissue (for example, muscle, adipose, or the like) selected as a specific composition is acquired. In the following description, a case where the object M is a human body and the specific composition is a bone will be described.

For each unit region of the radiation image the composition thickness acquisition unit 145 acquires the thickness of the specific composition corresponding to a combination of at least one imaging condition affecting a radiation dose transmitted through the object M at the time of capturing the radiation image the thickness of the object acquired for the unit region by the object thickness acquisition unit 144, and a value obtained by subtracting the second estimated thickness from the first estimated thickness with reference to information indicating a second correspondence relationship R2 described below stored in the storage unit 148. As described above, when the object M is a human body, in an image portion where an object including a bone is imaged, the object thickness which is greater than the actual thickness is determined as the second estimated thickness. For this reason, the value obtained by subtracting the second estimated thickness from the first estimated thickness is a negative value in an object including a bone, and the value has a given correspondence relationship (second correspondence relationship R2) with the thickness of the bone included in the object under the condition of the same imaging condition and object thickness. Therefore, the thickness of the specific composition can be acquired with reference to information indicating the second correspondence relationship R2 determined in advance by an acquisition method described below.

At this time, as one imaging condition at the time of imaging the object M, one or more imaging conditions affecting the radiation dose transmitted through the object M at the time of imaging, such as a tube voltage, a tube current, the type of a radiation source, and the presence or absence of a grid, are used. In the following description, a case where a tube voltage is used as at least one imaging condition affecting the radiation dose transmitted through the object M at the time of imaging will be described.

For each unit region of the radiation image the correction amount acquisition unit 146 acquires a contrast correction amount corresponding to a combination of the tube voltage as at least one imaging condition affecting the radiation dose transmitted through the object M at the time of capturing the radiation image the thickness of the object acquired for the unit region by the object thickness acquisition unit 144, and the thickness of the specific composition acquired by the composition thickness acquisition unit 145 with reference to information indicating a first correspondence relationship R1 described below stored in the storage unit 148. At this time, it is assumed that information indicating the first correspondence relationship R1 is determined in advance by an acquisition method described below and stored in the storage unit 148.

For each unit region of the radiation image the correction processing unit 147 performs contrast correction using the contrast correction amount acquired by the correction amount acquisition unit 146.

The storage unit 148 stores various kinds of information necessary for processing performed in the respective units described above including information indicating the first correspondence relationship R1 and information indicating the second correspondence relationship R2.

The first correspondence relationship R1 refers to the correspondence relationship of at least one imaging condition at the time of capturing the radiation image, the thickness of the object, the thickness of the specific composition included in the object, and the contrast correction amount. The first correspondence relationship R1 can be acquired by, for each condition of the expected thickness of the object and the thickness of the specific composition, preparing an experimental model simulating the condition, sequentially imaging the experimental model under each condition of the expected tube voltage, determining a correction value for correcting the pixel value of the radiation image obtained by each imaging to a pixel value to be originally acquired under the condition, and associating the determined correction value with the thickness of the object used for imaging, the thickness of the specific composition, and the tube voltage.

For example, as the experimental model, three acrylic blocks of a thickness of 10 cm including a material (hereinafter, referred to as "bone material) having a bone-equivalent composition of a thickness of 2 cm, 4 cm, and 6 cm in the radiation exposure direction, three acrylic blocks of a thickness of 15 cm including a bone material of a thickness of 2 cm, 4 cm, and 6 cm in the radiation exposure direction, three acrylic blocks of a thickness of 20 cm including a bone material of a thickness of 2 cm, 4 cm, and 6 cm in the radiation exposure direction, . . . are prepared. Here, the thickness of the acrylic block corresponds to the thickness of the object. The respective prepared acrylic blocks are sequentially imaged under the condition of the tube voltage of 60 kv, 80 kv, 100 kv, 120 kv, . . . , a correction value for correcting the pixel value of the radiation image obtained by each imaging to a pixel value to be originally acquired under the condition is determined, and the determined correction value is associated with the thickness of the object used for imaging, the thickness of the specific composition, and the tube voltage.

The second correspondence relationship R2 refers to the correspondence relationship of at least one imaging condition at the time of capturing the radiation image, the thickness of the object, a value obtained by subtracting a value obtained by converting the pixel value of the pixel with the object imaged on the radiation image to the thickness of the object by the conversion function from a value obtained by subtracting the distance between the radiation source and the object from the distance between the radiation source and the radiation detector, and the thickness of the specific composition included in the object. In regard to the second correspondence relationship R2, for each condition of the expected thickness of the object and the thickness of the specific composition, an experimental model simulating the condition is prepared, and the experimental model is sequentially imaged under each condition of the expected tube voltage. A value obtained by subtracting a value obtained by converting the pixel value of the radiation image obtained by each imaging to the thickness of the object by the conversion function described above from the thickness of the object simulated by the experimental model used for imaging is determined, and the determined value is associated with the thickness of the object in the experimental model used for imaging, the thickness of the specific composition, and the tube voltage. In this way, the second correspondence relationship R2 can be acquired.

For example, first, similarly to a case of acquiring the first correspondence relationship R1, as the experimental model, acrylic blocks of a thickness of 10 cm, 15 cm, . . . including a bone material of a thickness of 2 cm, 4 cm, and 6 cm in the radiation exposure direction are prepared, and the respective prepared acrylic blocks are sequentially imaged under the condition of the tube voltage of 60 kv, 80 kv, 100 kv, 120 kv, . . . . A value obtained by subtracting a value obtained by converting the pixel value of the radiation image obtained by each imaging to the thickness of the object by the conversion function described above from the thickness of the object simulated by the experimental model used for imaging is determined, and the determined value is associated with the thickness of the object in the experimental model used for imaging, the thickness of the specific composition, and the tube voltage. In this way, the second correspondence relationship R2 is acquired.

The display unit 6 is constituted of a cathode ray tube (CRT), a liquid crystal display, or the like, and assists the radiation image acquired by imaging and various inputs necessary for scattered radiation elimination processing described below. The input unit 8 is constituted of a keyboard, a mouse, a touch panel, and the like.

Figure 3:
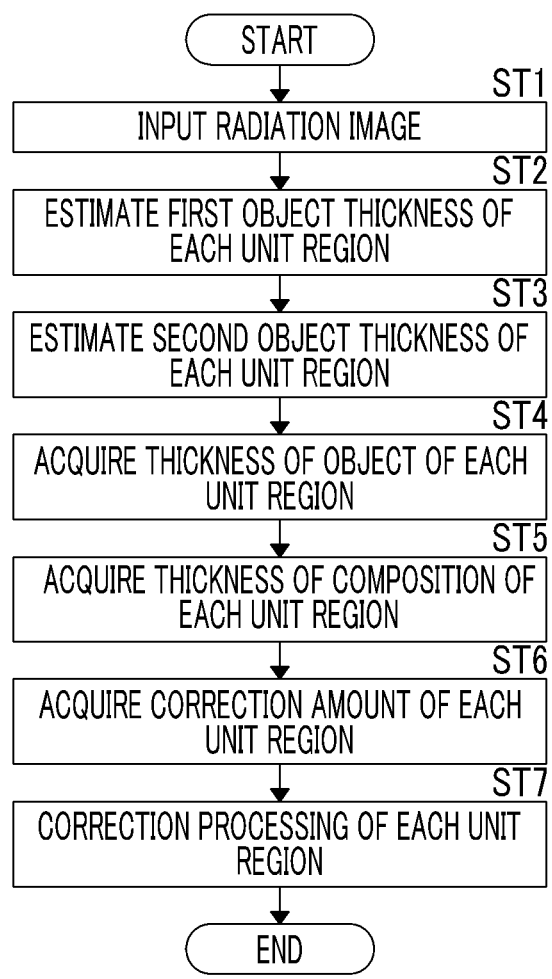
FIG. 3 is a flowchart showing processing which is performed in the first embodiment.

Next, processing which is performed in the first embodiment will be described. FIG. 3 is a flowchart showing processing which is performed in the first embodiment. If the radiation image G acquired in the imaging device 1 is input to the computer 4 (Step ST1), for each unit region of the radiation image the first object thickness estimation unit 142 determines a value obtained by subtracting the distance between the X-ray source 3 and the surface of the object corresponding to the unit region from the distance between the X-ray source 3 and the radiation detector 5 as the first estimated thickness of the object corresponding to the unit region (Step ST2). For each unit region of the radiation image the second object thickness estimation unit 143 determines a value obtained by converting the pixel value representing the unit region to the thickness of the object M by a predetermined conversion function as the second estimated thickness of the object corresponding to the unit region (Step ST3). For each unit region of the radiation image the object thickness acquisition unit 144 acquires the first estimated thickness determined in Step ST2 as the thickness of the object corresponding to the unit region (Step ST4). The processing of one of Steps ST2 and ST3 may be performed earlier, or the processing of Steps ST2 and ST3 may be performed in parallel. The processing of one of Steps ST3 and ST4 may be performed earlier, or the processing of Steps ST3 and ST4 may be performed in parallel.

Next, for each unit region of the radiation image the composition thickness acquisition unit 145 acquires the thickness of the specific composition corresponding to a combination of the tube voltage as at least one imaging condition affecting a radiation dose transmitted through the object M at the time of capturing the radiation image the thickness of the object acquired for the unit region in Step ST4, and a value obtained by subtracting the second estimated thickness determined in Step ST3 from the first estimated thickness determined in Step ST2 with reference to information indicating the second correspondence relationship R2 stored in the storage unit 148 (Step ST5). For each unit region of the radiation image the correction amount acquisition unit 146 acquires a contrast correction amount corresponding to a combination of the tube voltage as at least one imaging condition affecting a radiation dose transmitted through the object M at the time of capturing the radiation image the thickness of the object acquired for the unit region in Step ST4, and the thickness of the specific composition acquired for the unit region in Step ST5 with reference to information indicating the first correspondence relationship R1 stored in the storage unit 148 (Step ST6). Finally, for each unit region of the radiation image the correction processing unit 147 performs contrast correction using the contrast correction amount acquired in Step ST6 (Step ST7), and ends the processing. The contrast-corrected radiation image is displayed on the display unit 6 and provided for diagnosis, or is transmitted and saved to an external image server.

Figure 4:
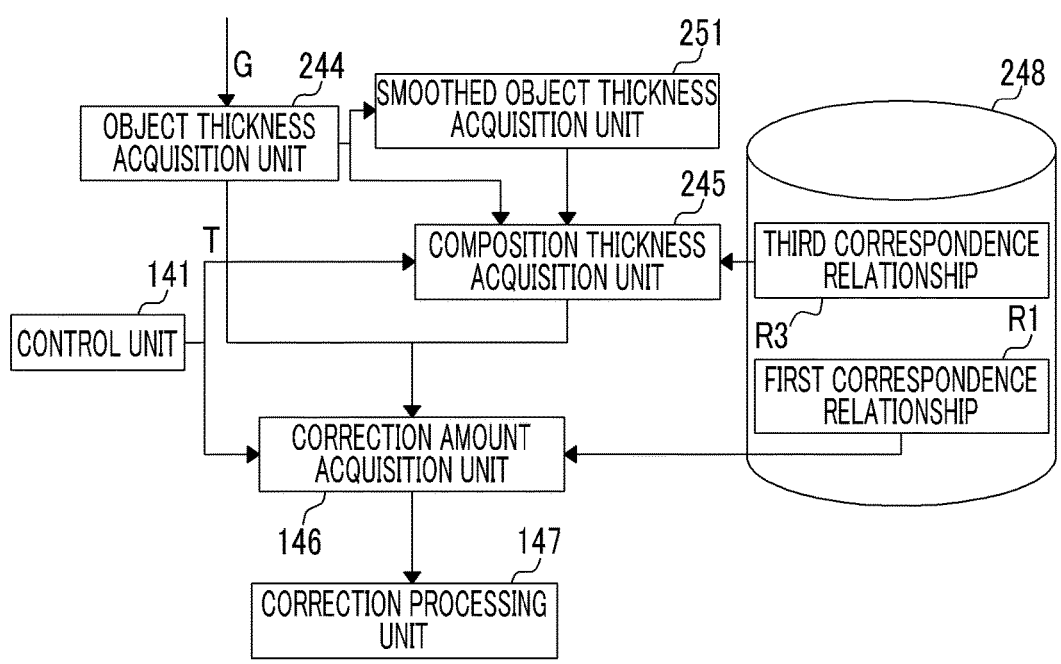
FIG. 4 is a block diagram showing the schematic configuration of the inside of a computer of a radiation imaging system in a second embodiment.

Next, a second embodiment of the invention will be described. FIG. 4 is a block diagram showing the schematic configuration of the inside of a computer of a radiation imaging system in the second embodiment. In FIG. 4, the same configurations as those in FIG. 2 are represented by the same reference numerals, and detailed description thereof will not be repeated. The second embodiment is different from the first embodiment in that the thickness of the object M of each unit region is acquired based on the radiation image and the thickness of the specific composition of each unit region is acquired based on the difference between the acquired thickness distribution of the object M and the smoothed thickness distribution of the object.

In the second embodiment, the computer 4 includes a central processing unit (CPU), a semiconductor memory, a communication interface, a storage device, and the like, and a control unit 141, an object thickness acquisition unit 244, a smoothed object thickness acquisition unit 251, a composition thickness acquisition unit 245, a correction amount acquisition unit 146, a correction processing unit 147, and a storage unit 248 shown in FIG. 4 are constituted of these kinds of hardware. The object thickness acquisition unit 244, the composition thickness acquisition unit 245, the correction amount acquisition unit 146, the correction processing unit 147, and the storage unit 248 constitute a radiation image processing device of the invention.

Similarly to a case of acquiring the first estimated thickness in the first embodiment, for each unit region of the radiation image the object thickness acquisition unit 244 acquires a value obtained by converting the pixel value representing the unit region to the thickness of the object M by the conversion function described above as the thickness of the object corresponding to the unit region in the direction of exposure of radiation. With this, the thickness distribution T of the object of each unit region is obtained.

The smoothed object thickness acquisition unit 251 smoothes the distribution T of the thickness of the object acquired for each unit region by the object thickness acquisition unit 244 to determine the thickness of the object of each unit region after smoothing.

For each unit region of the radiation image the composition thickness acquisition unit 245 acquires the thickness of the specific composition corresponding to a combination of at least one imaging condition (for example, a tube voltage) affecting a radiation dose transmitted through the object M at the time of capturing the radiation image one of the thickness of the object in the unit region acquired by the object thickness acquisition unit 244 and the thickness of the object in the unit region after smoothing determined by the smoothed object thickness acquisition unit 251, and a value obtained by subtracting the thickness of the object in the unit region after smoothing determined by the smoothed object thickness acquisition unit 251 from the thickness of the object in the unit region acquired by the object thickness acquisition unit 244 with reference to information indicating the third correspondence relationship R3 described below stored in the storage unit 248. If the thickness distribution T of the object is smoothed, when the object M is a human body, in an image portion when an object including a bone is imaged, the thickness after smoothing becomes smaller than the thickness before smoothing. For this reason, a value obtained by subtracting the thickness of the object in the unit region after smoothing obtained by smoothing the thickness distribution T of the object from the thickness before smoothing is a positive value in an object including a bone, and the value has a given correspondence relationship (third correspondence relationship R3) with the thickness of the bone included in the object under the condition of the same imaging condition and object thickness. Therefore, the thickness of the specific composition can be acquired with reference to information indicating the third correspondence relationship R3 determined in advance by an acquisition method described below.

The storage unit 248 stores various kinds of information necessary for processing performed in the respective units described above including information indicating the first correspondence relationship R1 and information indicating the third correspondence relationship R3. The first correspondence relationship R1 is the same as that described in the first embodiment, and thus description thereof will not be repeated. In the following description, the third correspondence relationship will be described.

The third correspondence relationship R3 refers to the correspondence relationship of at least one imaging condition at the time of capturing the radiation image, the thickness of the object, the difference in the thickness of the object estimated by the radiation images before and after smoothing, and the thickness of the specific composition included in the object. In regard to the third correspondence relationship R3, similarly to a case of acquiring the first correspondence relationship R1, for example, first, as an experimental model, acrylic blocks of a thickness of 10 cm, 15 cm, . . . including a bone material of a thickness of 2 cm, 4 cm, and 6 cm in the radiation exposure direction are prepared, and the respective prepared acrylic blocks are sequentially imaged under the condition of the tube voltage of 60 kv, 80 kv, 100 kv, 120 kv, . . . . The difference between the value obtained by converting the pixel value of the radiation image obtained by each imaging to the thickness of the object by the conversion function described above and the value obtained by smoothing the distribution of the value converted to the thickness of the object is determined, and the determined value is associated with the thickness of the object in the experimental model used for imaging, the thickness of the specific composition, and the tube voltage. In this way, the third correspondence relationship R3 can be acquired.

Figure 5:
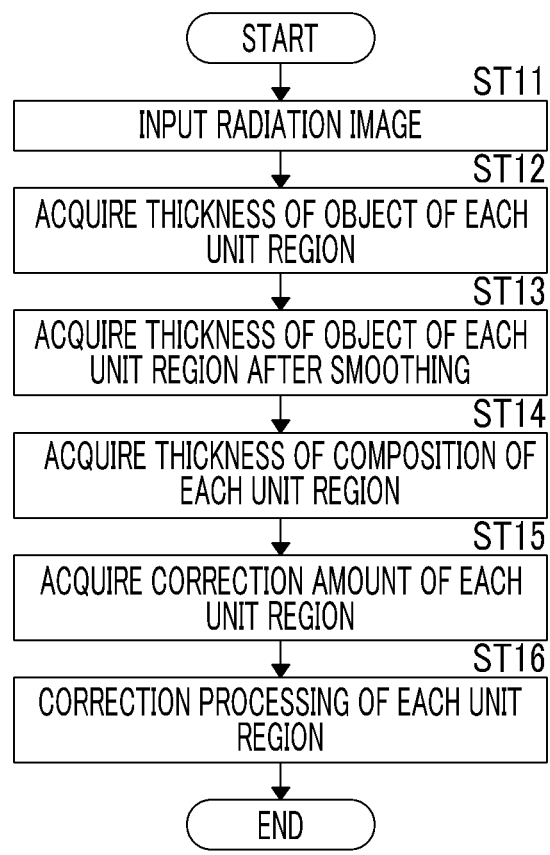
FIG. 5 is a flowchart showing processing which is performed in the second embodiment.

Next, processing which is performed in the second embodiment will be described. FIG. 5 is a flowchart showing processing which is performed in the second embodiment. If the radiation image G acquired in the imaging device 1 is input to the computer 4 (Step ST11), for each unit region of the radiation image the object thickness acquisition unit 244 acquires a value obtained by converting the pixel value representing the unit region to the thickness of the object M by the conversion function described above as the thickness of the object corresponding to the unit region. With this, the thickness distribution T of the object of each unit region is obtained (Step ST12). Next, the smoothed object thickness acquisition unit 251 smoothes the distribution T of the thickness of the object acquired for the unit region in Step ST12 to determine the thickness of the object of each unit region after smoothing (Step ST13).

Next, for each unit region of the radiation image the composition thickness acquisition unit 245 acquires the thickness of the specific composition corresponding to a combination of the tube voltage as at least one imaging condition affecting a radiation dose transmitted through the object M at the time of capturing the radiation image one of the thickness of the object in the unit region acquired in Step ST12 and the thickness of the object in the unit region after smoothing acquired in Step ST13, and a value obtained by subtracting the thickness of the object in the unit region after smoothing determined in Step ST13 from the thickness of the object in the unit region acquired in Step ST12 with reference to information indicating the third correspondence relationship R3 stored in the storage unit 248 (Step ST14).

For each unit region of the radiation image the correction amount acquisition unit 146 acquires a contrast correction amount corresponding to a combination of the tube voltage as at least one imaging condition affecting a radiation dose transmitted through the object M at the time of capturing the radiation image the thickness of the object acquired for the unit region in Step ST12, and the thickness of the specific composition acquired for the unit region in Step ST14 with reference to information indicating the first correspondence relationship R1 stored in the storage unit 248 (Step ST15). Finally, for each unit region of the radiation image the correction processing unit 147 performs contrast correction using the contrast correction amount acquired in Step ST16 (Step ST17), and ends the processing. The contrast-corrected radiation image is displayed on the display unit 6 and provided for diagnosis, or is transmitted and saved to an external image server.

Figure 6:
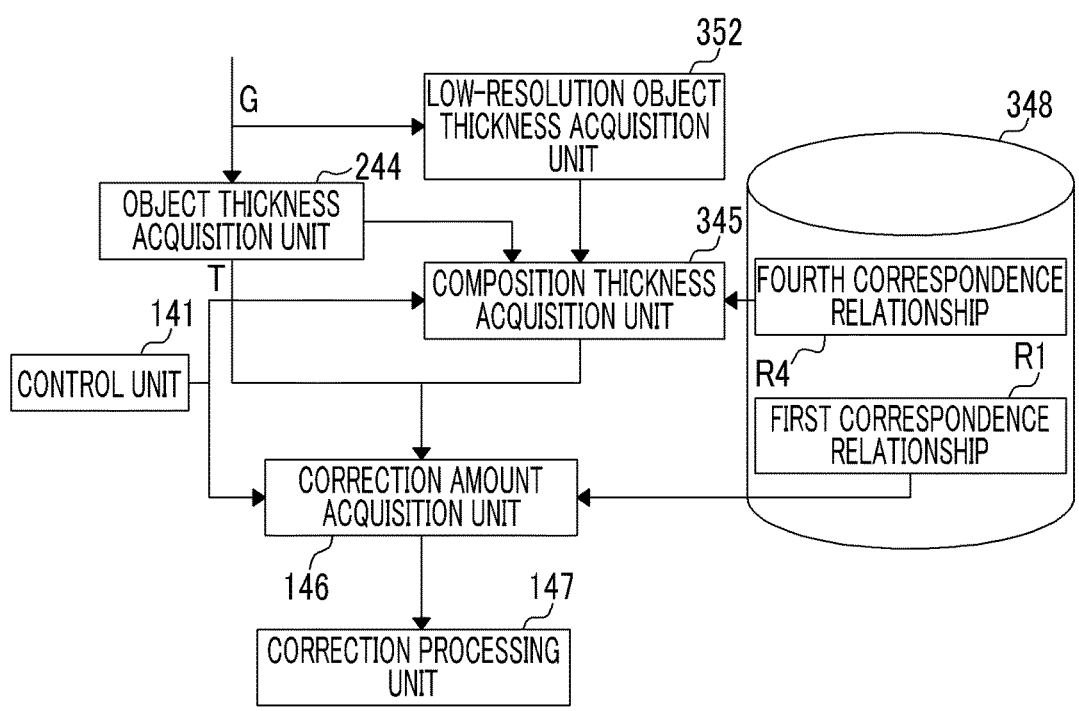
FIG. 6 is a block diagram showing the schematic configuration of the inside of a computer of a radiation imaging system in a third embodiment.

Next, a third embodiment of the invention will be described. FIG. 6 is a block diagram showing the schematic configuration of the inside of a computer of a radiation imaging system in the third embodiment. In FIG. 6, the same configurations as those in FIG. 2 or 4 are represented by the same reference numerals, and detailed description thereof will not be repeated. The third embodiment is different from the second embodiment in that the thickness of the specific composition is acquired based on the difference between a value obtained by converting the pixel value of the radiation image G to the thickness of the object M by a conversion function and a value obtained by converting the pixel value of a low-resolution image generated from the radiation image G to the thickness of the object M by a conversion function.

In the third embodiment, the computer 4 includes a central processing unit (CPU), a semiconductor memory, a communication interface, a storage device, and the like, and a control unit 141, an object thickness acquisition unit 244, a low-resolution object thickness acquisition unit 352, a composition thickness acquisition unit 345, a correction amount acquisition unit 146, a correction processing unit 147, and a storage unit 348 shown in FIG. 6 are constituted of these kinds of hardware. The object thickness acquisition unit 244, the composition thickness acquisition unit 345, the correction amount acquisition unit 146, the correction processing unit 147, and the storage unit 348 constitute a radiation image processing device of the invention.

The low-resolution object thickness acquisition unit 352 generates a low-resolution image with lower resolution than the radiation image G from the radiation image and for each corresponding unit region corresponding to each unit region in the generated low-resolution image, acquires a value obtained by converting the pixel value representing the corresponding unit region to the thickness of the object M by the conversion function described above as the thickness of the object corresponding to the corresponding unit region.

For each unit region of the radiation image the composition thickness acquisition unit 345 acquires the thickness of the specific composition corresponding to a combination of at least one imaging condition (for example, a tube voltage) affecting a radiation dose transmitted through the object M at the time of capturing the radiation image one of the thickness of the object in the unit region acquired by the object thickness acquisition unit 244 and the thickness of the object in the corresponding unit region corresponding to the unit region acquired by the low-resolution object thickness acquisition unit 352, and a value obtained by subtracting the thickness of the object in the corresponding unit region corresponding to the unit region acquired by the low-resolution object thickness acquisition unit 352 from the thickness of the object in the unit region acquired by the object thickness acquisition unit 244 with reference to information indicating the fourth correspondence relationship R4 described below stored in the storage unit 348.

When the object M is a human body, in an image portion where an object including a bone is imaged, the thickness of the object obtained from the radiation image with low resolution becomes smaller than the thickness of the object obtained from the original radiation image. For this reason, a value obtained by subtracting the thickness of the object acquired for the corresponding unit region corresponding to the unit region from the thickness of the object acquired for the unit region is a positive value in an object including a bone, and the value has a given correspondence relationship (fourth correspondence relationship R4) with the thickness of the bone included in the object under the condition of the same imaging condition and object thickness. Therefore, the thickness of the specific composition can be acquired with reference to information indicating the fourth correspondence relationship R4 determined in advance by an acquisition method described below.

The storage unit 348 stores various kinds of information necessary for processing performed in the respective units described above including the first correspondence relationship R1 and the fourth correspondence relationship R4. The first correspondence relationship R1 is the same as that described in the first embodiment, and thus description thereof will not be repeated. In the following description, the fourth correspondence relationship R4 will be described.

The fourth correspondence relationship R4 refers to the correspondence relationship of at least one imaging condition at the time of capturing the radiation image, the thickness of the object, the difference in the thickness of the object estimated by the radiation images with different resolution, and the thickness of the specific composition included in the object. In regard to the fourth correspondence relationship R4, similarly to a case of acquiring the first correspondence relationship R1, for example, first, as an experimental model, acrylic blocks of a thickness of 10 cm, 15 cm, . . . including a bone material of a thickness of 2 cm, 4 cm, and 6 cm in the radiation exposure direction are prepared, and the respective prepared acrylic blocks are sequentially imaged under the condition of the tube voltage of 60 kv, 80 kv, 100 kv, 120 kv, . . . . The difference between a value obtained by converting the pixel value of the radiation image obtained by each imaging to the thickness of the object by the conversion function described above and a value obtained by associating a value obtained by converting the pixel value of an image with higher or lower resolution than the image to the thickness of the object by the conversion function described above with a unit pixel of the radiation image described above is determined, and the determined value is associated with the thickness of the object in the experimental model used for imaging, the thickness of the specific composition, and the tube voltage. In this way, the fourth correspondence relationship R4 can be acquired.

Figure 7:
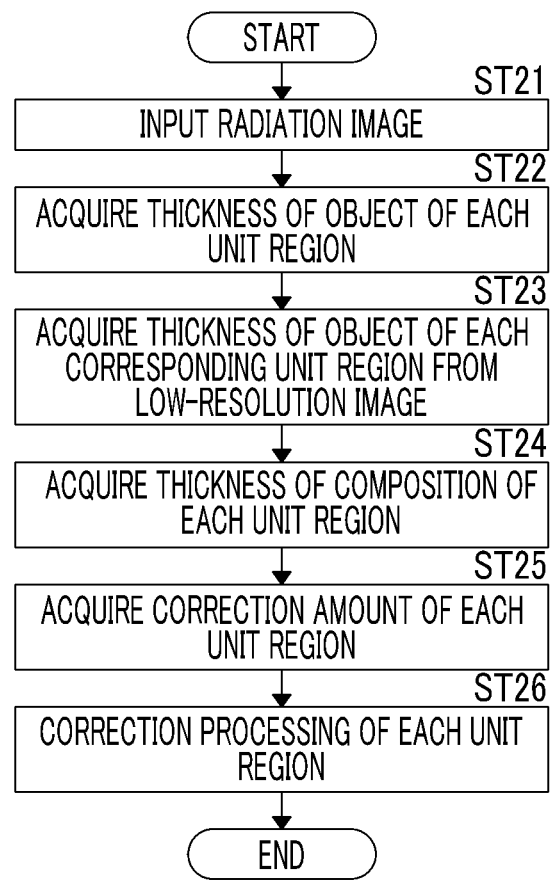
FIG. 7 is a flowchart showing processing which is performed in the third embodiment.

Next, processing which is performed in the third embodiment will be described. FIG. 7 is a flowchart showing processing which is performed in the third embodiment. If the radiation image G acquired in the imaging device 1 is input to the computer 4 (Step ST21), for each unit region of the radiation image the object thickness acquisition unit 244 acquires a value obtained by converting the pixel value representing the unit region to the thickness of the object M by a predetermined conversion function as the thickness of the object corresponding to the unit region. With this, the thickness distribution T of the object of each unit region is obtained (Step ST22). Next, the low-resolution object thickness acquisition unit 352 generates the low-resolution image with lower resolution than the radiation image G from the radiation image and for each corresponding unit region corresponding to each unit region in the generated low-resolution image, acquires a value obtained by converting the pixel value representing the corresponding unit region to the thickness of the object M by the conversion function described above as the thickness of the object corresponding to the corresponding unit region (Step ST23).

Next, for each unit region of the radiation image the composition thickness acquisition unit 345 acquires the thickness of the specific composition corresponding to a combination of the tube voltage as at least one imaging condition affecting a radiation dose transmitted through the object M at the time of capturing the radiation image one of the thickness of the object in the unit region acquired in Step ST22 and the thickness of the object in the corresponding unit region corresponding to the unit region acquired in Step ST23, and a value obtained by subtracting the thickness of the object in the corresponding unit region corresponding to the unit region acquired in Step ST23 from the thickness of the object in the unit region acquired in Step ST22 with reference to information indicating the fourth correspondence relationship R4 stored in the storage unit 348 (Step ST24).

For each unit region of the radiation image the correction amount acquisition unit 146 acquires a contrast correction amount corresponding to a combination of the tube voltage as at least one imaging condition affecting a radiation dose transmitted through the object M at the time of capturing the radiation image the thickness of the object acquired for the unit region in Step ST22, and the thickness of the specific composition acquired for the unit region in Step ST24 with reference to information indicating the first correspondence relationship R1 stored in the storage unit 248 (Step ST25). Finally, for each unit region of the radiation image the correction processing unit 147 performs contrast correction using the contrast correction amount acquired in Step ST25 (Step ST26), and ends the processing. The contrast-corrected radiation image is displayed on the display unit 6 and provided for diagnosis, or is transmitted and saved to an external image server.

Figure 8:
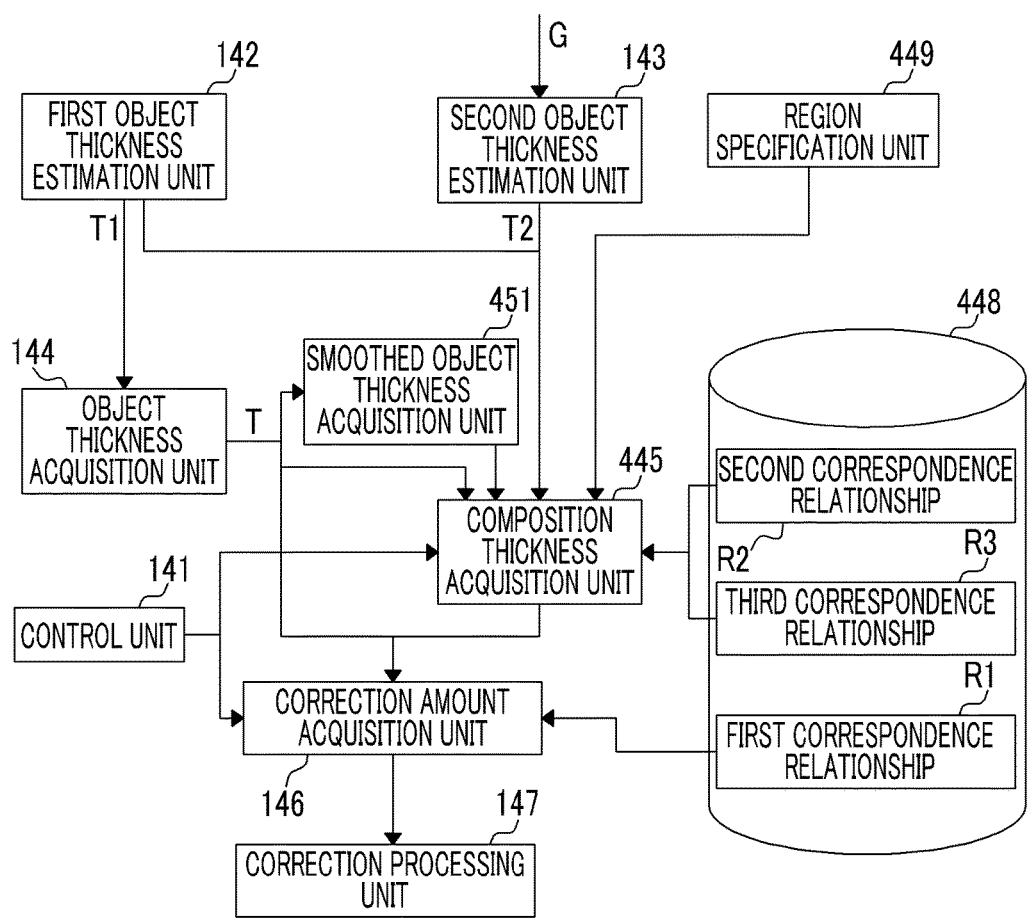
FIG. 8 is a block diagram showing the schematic configuration of the inside of a computer of a radiation imaging system in a fourth embodiment.

Next, a fourth embodiment of the invention will be described. FIG. 8 is a block diagram showing the schematic configuration of the inside of a computer of a radiation imaging system in the fourth embodiment. In FIG. 8, the same configurations as those in FIG. 2 are represented by the same reference numerals, and detailed description thereof will not be repeated. The fourth embodiment is different from the first embodiment in that an air containing region as a region with an object including an air region imaged in the radiation image G is specified, in the specified air containing region, the thickness of the specific composition of each unit region is acquired by the method described in the second embodiment, and in other regions, and the thickness of the specific composition of each unit region is acquired by the method described in the first embodiment.

In the fourth embodiment, the computer 4 includes a central processing unit (CPU), a semiconductor memory, a communication interface, a storage device, and the like, and a control unit 141, a first object thickness estimation unit 142, a second object thickness estimation unit 143, an object thickness acquisition unit 144, a smoothed object thickness acquisition unit 451, a region specification unit 449, a composition thickness acquisition unit 445, a correction amount acquisition unit 146, a correction processing unit 147, and a storage unit 448 shown in FIG. 8 are constituted of these kinds of hardware. The first object thickness estimation unit 142, the second object thickness estimation unit 143, the object thickness acquisition unit 144, the region specification unit 449, the composition thickness acquisition unit 445, the correction amount acquisition unit 146, the correction processing unit 147, and the storage unit 448 constitute a radiation image processing device of the invention.

The smoothed object thickness acquisition unit 451 smoothes the distribution T of the thickness of the object acquired for each unit region by the object thickness acquisition unit 144 to determine the thickness of the object of each unit region after smoothing.

The region specification unit 449 specifies an air containing region in the radiation image G. Specifically, as described in the first embodiment, when the object M is a human body, in an image portion with an object including an air region imaged, the object thickness which is smaller than the actual thickness is determined as the second estimated thickness, and a value obtained by subtracting the second estimated thickness from the first estimated thickness is a positive value in an object including an air region. For this reason, the region specification unit 449 can specify, as an object including an air region, a region where the value obtained by subtracting the second estimated thickness from the first estimated thickness is a positive value. When the object M is a chest of a human body, a lung field region in the radiation image G may be recognized by known lung field recognition processing, and the recognized lung field region may be specified as an object including an air region.

The composition thickness acquisition unit 445 acquires the thickness of the specific composition in the respective regions by two different methods described below for the air containing region specified by the region specification unit 449 and other regions of the radiation image G. Specifically, in the air containing region, for each unit region, the thickness of the specific composition corresponding to a combination of at least one imaging condition (for example, a tube voltage) affecting the radiation dose transmitted through the object M at the time of capturing the radiation image, one of the thickness of the object in the unit region acquired by the object thickness acquisition unit 144 and the thickness of the object in the unit region after smoothing determined by the smoothed object thickness acquisition unit 451, and a value obtained by subtracting the thickness of the object in the unit region after smoothing determined by the smoothed object thickness acquisition unit 451 from the thickness of the object in the unit region acquired by the object thickness acquisition unit 144 is acquired with reference to information indicating the third correspondence relationship R3 stored in the storage unit 448. In the region other than the air containing region, for each unit region, the thickness of the specific composition corresponding to a combination of at least one imaging condition (for example, a tube voltage) affecting a radiation dose transmitted through the object M at the time of capturing the radiation image the thickness of the object acquired for the unit region by the object thickness acquisition unit 144, and a value obtained by subtracting the second estimated thickness from the first estimated thickness is acquired with reference to information indicating the second correspondence relationship R2 stored in the storage unit 448.

The storage unit 448 stores various kinds of information necessary for processing performed in the respective units described above including information indicating the first correspondence relationship R1, information indicating the second correspondence relationship R2, and information indicating the third correspondence relationship R3. All of the first correspondence relationship R1, the second correspondence relationship R2, and the third correspondence relationship R3 are the same as those described in the first and second embodiments, and description thereof will not be repeated.

Figure 9:
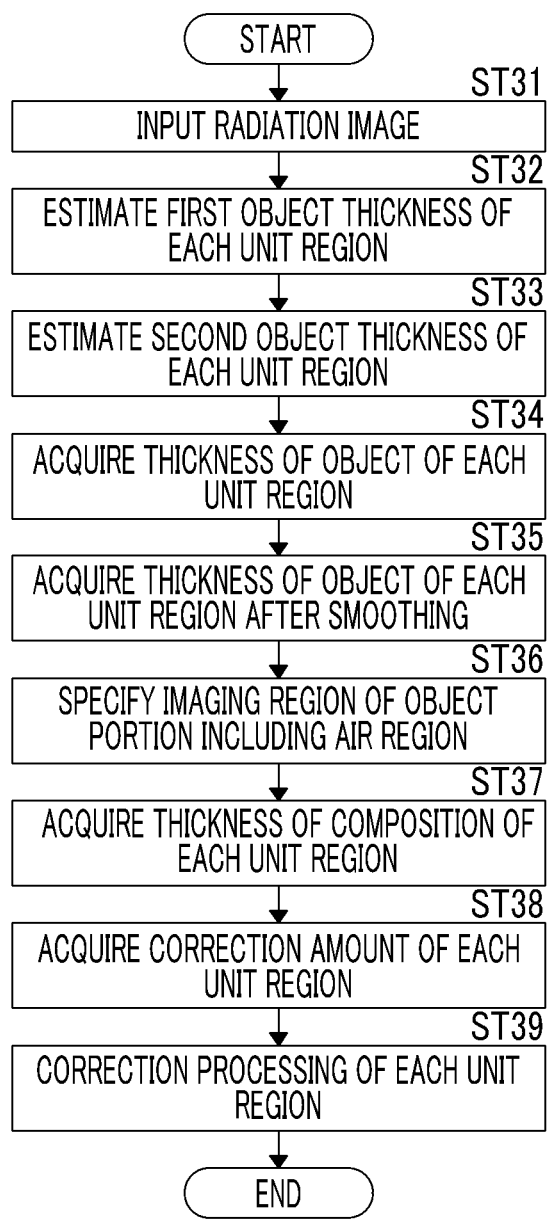
FIG. 9 is a flowchart showing processing which is performed in the fourth embodiment.

Next, processing which is performed in the fourth embodiment will be described. FIG. 9 is a flowchart showing processing which is performed in the fourth embodiment. If the radiation image G acquired in the imaging device 1 is input to the computer 4 (Step ST31), for each unit region of the radiation image the first object thickness estimation unit 142 determines a value obtained by subtracting the distance between the X-ray source 3 and the surface of the object corresponding to the unit region from the distance between the X-ray source 3 and the radiation detector 5 as the first estimated thickness of the object corresponding to the unit region (Step ST32). For each unit region of the radiation image the second object thickness estimation unit 143 determines a value obtained by converting the pixel value representing the unit region to the thickness of the object M by a predetermined conversion function as the second estimated thickness of the object corresponding to the unit region (Step ST33). For each unit region of the radiation image the object thickness acquisition unit 144 acquires the first estimated thickness determined in Step ST32 as the thickness of the object corresponding to the unit region (Step ST34). The processing of one of Steps ST32 and ST33 may be performed earlier, or the processing of Steps ST32 and ST33 may be performed in parallel. The processing of one of Steps ST33 and ST34 may be performed earlier, or the processing of Steps ST33 and ST34 may be performed in parallel.

Next, the smoothed object thickness acquisition unit 451 smoothes the thickness T of the thickness of the object acquired for each unit region by the object thickness acquisition unit 144 to determine the thickness of the object of each unit region after smoothing (Step ST35). The region specification unit 449 specifies the air containing region in the radiation image G (Step ST36).

In the air containing region of the radiation image G specified in Step ST36, for each unit region, the composition thickness acquisition unit 445 acquires the thickness of the specific composition corresponding to a combination of the tube voltage as at least one imaging condition affecting a radiation dose transmitted through the object M at the time of capturing the radiation image one of the thickness of the object in the unit region acquired in Step ST34 and the thickness of the object in the unit region after smoothing determined in Step ST35, and a value obtained by subtracting the thickness of the object in the unit region after smoothing determined in Step ST35 from the thickness of the object in the unit region acquired in Step ST34 with reference to information indicating the third correspondence relationship R3 stored in the storage unit 448. In the region other than the air containing region, for each unit region, the composition thickness acquisition unit 445 acquires the thickness of the specific composition corresponding to a combination of the tube voltage as at least one imaging condition affecting a radiation dose transmitted through the object M at the time of capturing the radiation image the thickness of the object acquired for the unit region in Step ST34, and a value obtained by subtracting the second estimated thickness determined in Step ST33 from the first estimated thickness determined in Step ST32 with reference to information indicating the second correspondence relationship R2 stored in the storage unit 448 (Step ST37).

For each unit region of the radiation image the correction amount acquisition unit 146 acquires a contrast correction amount corresponding to a combination of the tube voltage as at least one imaging condition affecting a radiation dose transmitted through the object M at the time of capturing the radiation image the thickness of the object acquired for the unit region in Step ST34, and the thickness of the specific composition acquired for the unit region in Step ST37 with reference to information indicating the first correspondence relationship R1 stored in the storage unit 448 (Step ST38). Finally, for each unit region of the radiation image the correction processing unit 147 performs contrast correction using the contrast correction amount acquired in Step ST38 (Step ST39), and ends the processing. The contrast-corrected radiation image is displayed on the display unit 6 and provided for diagnosis, or is transmitted and saved to an external image server.

Figure 10:
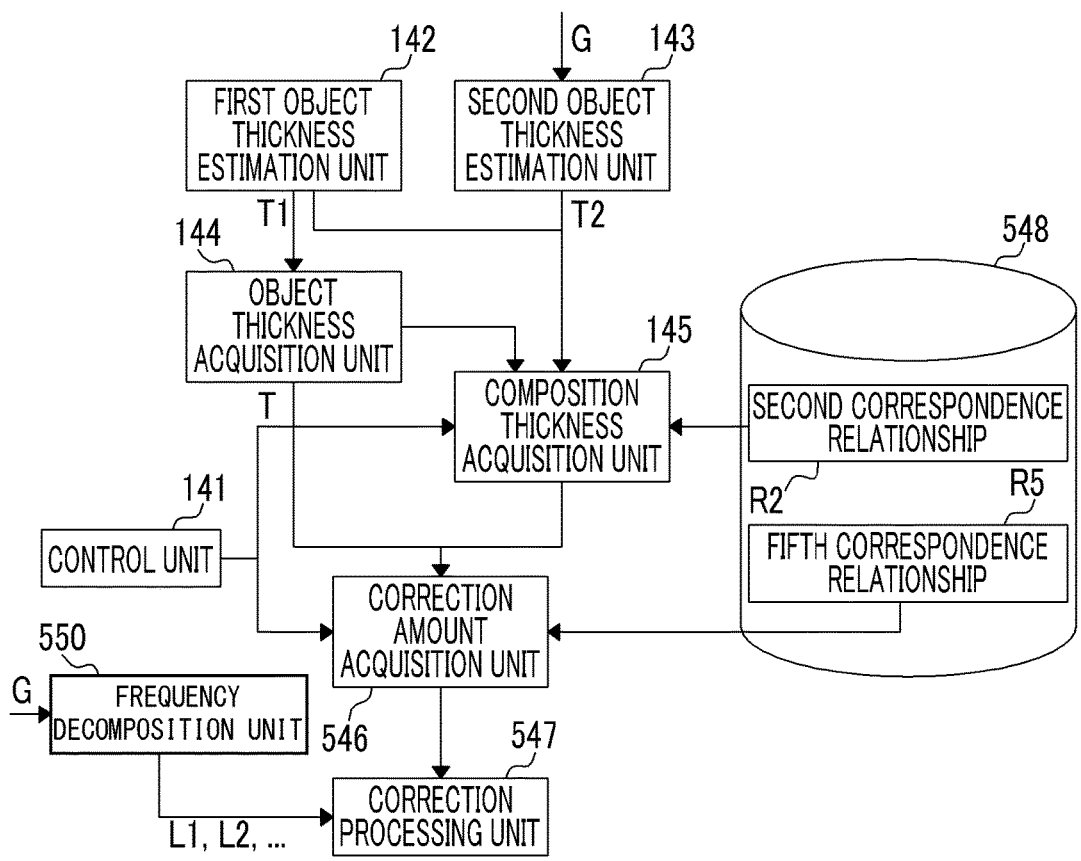
FIG. 10 is a block diagram showing the schematic configuration of the inside of a computer of a radiation imaging system in a fifth embodiment.
Figure 11:
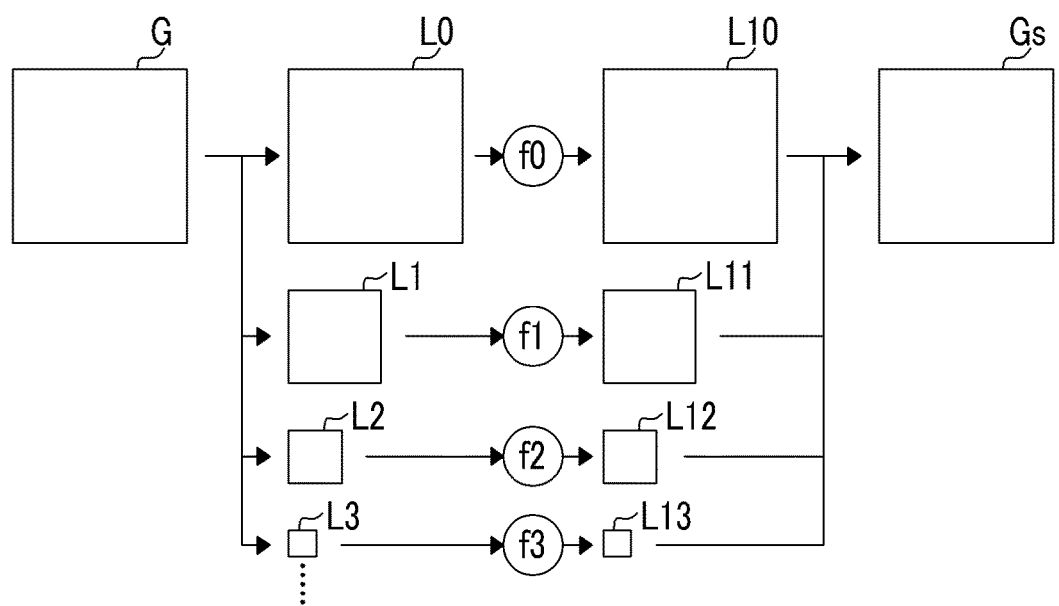
FIG. 11 is a diagram schematically showing processing which is performed in the fifth embodiment.

Next, a fifth embodiment of the invention will be described. FIG. 10 is a block diagram showing the schematic configuration of the inside of a computer of a radiation imaging system in the fifth embodiment. In FIG. 10, the same configurations as those in FIG. 2 are represented by the same reference numerals, and detailed description thereof will not be repeated. The fifth embodiment is different from the first embodiment in that, as shown in FIG. 11, the radiation image G is frequency-resolved to generate band images L0, L1, . . . representing the frequency components of a plurality of frequency bands, contrast correction is performed on the respective generated band images, and all band images L10, L11, . . . after correction are synthesized to generate a processed radiation image Gs.

In the fourth embodiment, the computer 4 includes a central processing unit (CPU), a semiconductor memory, a communication interface, a storage device, and the like, and a control unit 141, a first object thickness estimation unit 142, a second object thickness estimation unit 143, an object thickness acquisition unit 144, a composition thickness acquisition unit 145, a frequency decomposition unit 550, a correction amount acquisition unit 546, a correction processing unit 547, and a storage unit 548 shown in FIG. 10 are constituted of these kinds of hardware. The first object thickness estimation unit 142, the second object thickness estimation unit 143, the object thickness acquisition unit 144, the composition thickness acquisition unit 145, the frequency decomposition unit 550, the correction amount acquisition unit 546, the correction processing unit 547, and the storage unit 548 constitute a radiation image processing device of the invention.

Figure 12:
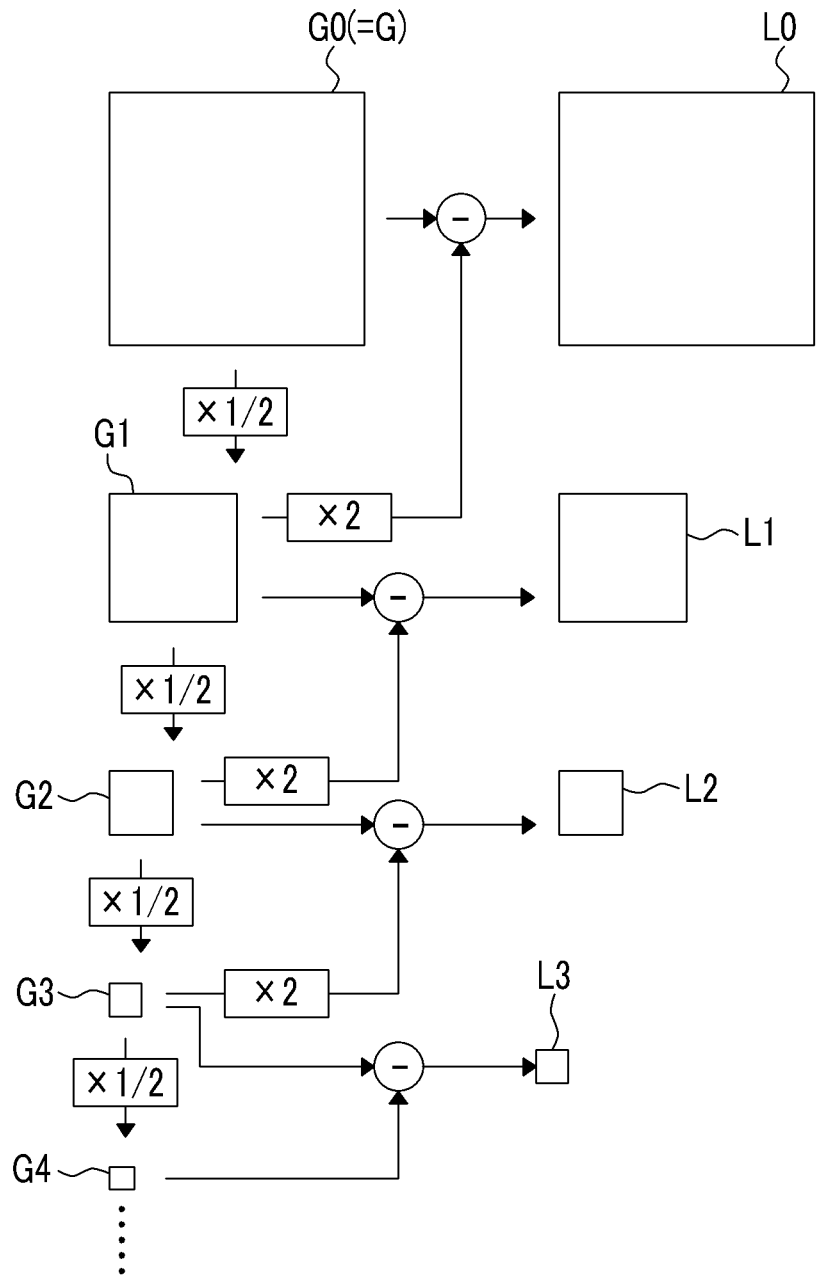
FIG. 12 is a diagram illustrating frequency decomposition.

The frequency decomposition unit 550 performs frequency decomposition of the radiation image G to generate band images L0, L1, . . . representing the frequency components of a plurality of frequency bands. FIG. 12 is a diagram illustrating frequency decomposition which is performed by the frequency decomposition unit 550. First, the frequency decomposition unit 550 performs filtering on a radiation image G0 (=radiation image G) by, for example, a Gaussian filter of $\sigma=1$ and reduces the radiation image G0 to half to generate a reduced image G1 as a Gaussian component. The reduced image G1 is obtained by reducing the radiation image G0 to half. Next, the frequency decomposition unit 550 performs interpolation calculation, such as third-order B spline interpolation, enlarges the reduced image G1 to the same size of the radiation image G0, and subtracts the enlarged reduced image G1 from the radiation image G0 to generate a band image L0 as a Laplacian component of the highest frequency band. In this embodiment, for convenience, the highest frequency band is referred to as the zero-th frequency band.

Next, the frequency decomposition unit 550 performs filtering on the reduced image G1 by a Gaussian filter of $\sigma=1$ and reduces the reduced image G1 to half to generate a reduced image G2, enlarges the reduced image G2 to the same size as the reduced image G1, and subtracts the enlarged reduced image G2 from the reduced image G1 to generate a band image L1 of a first frequency band. In addition, the processing described above is repeated until a band image of a desired frequency band is generated, thereby generating band images Lj (j=0 to n) of a plurality of frequency bands. In this embodiment, for example, the processing described above is repeated until a band image L3 of a third frequency band is obtained.

Here, the signal value of each pixel of the reduced image represents the density of the pixel, and the signal value of each pixel of the band image Lj represents the magnitude of the frequency component of the frequency band in the pixel. A plurality of band images of different frequency bands may be generated by other methods for multiple resolution conversion, such as wavelet conversion.

For the respective band images L0, L1, . . . generated by the frequency decomposition unit 550, the correction amount acquisition unit 546 acquires contrast correction amounts f0, f1, . . . of the regions corresponding to the unit regions of the radiation image G with reference to information indicating the fifth correspondence relationship R5 stored in the storage unit 548. For each frequency band of each band image, the fifth correspondence relationship R5 represents the correspondence relationship of at least one imaging condition (for example, a tube voltage) affecting the radiation dose transmitted through the object M at the time of capturing the radiation image, the thickness of the object M, the thickness of the specific composition included in the object M, and the contrast correction amount. Accordingly, for the respective band images L1, L2, . . . , for the respective regions corresponding to the unit regions of the radiation image the correction amount acquisition unit 546 acquires a contrast correction amount corresponding to a combination of information representing the frequency band of the band image, at least one imaging condition (for example, a tube voltage) affecting the radiation dose transmitted through the object M at the time of capturing the radiation image, the thickness of the object acquired for the unit region by the object thickness acquisition unit 144, and the thickness of the specific composition acquired by the composition thickness acquisition unit 145 with reference to information indicating the fifth correspondence relationship R5.

For the respective regions of the band images L0, L1, . . . corresponding to the unit regions of the radiation image as shown in FIG. 11, the correction processing unit 547 performs contrast correction using the contrast correction amount acquired by the correction amount acquisition unit 546, and synthesizes all band images L10, L11, . . . after correction to generate a processed radiation image Gs.

The storage unit 548 stores various kinds of information necessary for processing performed in the respective units described above including information indicating the second correspondence relationship R2 and information indicating the fifth correspondence relationship R5. The second correspondence relationship R2 is the same as described in the first embodiment, and thus description thereof will not be repeated. In the following description, an acquisition method of the fifth correspondence relationship R5 will be described.

The fifth correspondence relationship R5 can be acquired by, for each condition of the expected thickness of the object and the thickness of the specific composition, preparing an experimental model simulating the condition, sequentially imaging the experimental model to acquire a radiation image under each condition of the expected tube voltage, performing frequency decomposition of each acquired radiation image to generate band images representing the frequency components of a plurality of frequency bands, determining a correction value for correcting the pixel value of each band image to a pixel value to be originally acquired under this condition, and associating the determined correction value with information representing the frequency band of the band image, the thickness of the object used for imaging, the thickness of the specific composition, and the tube voltage.

Figure 13:
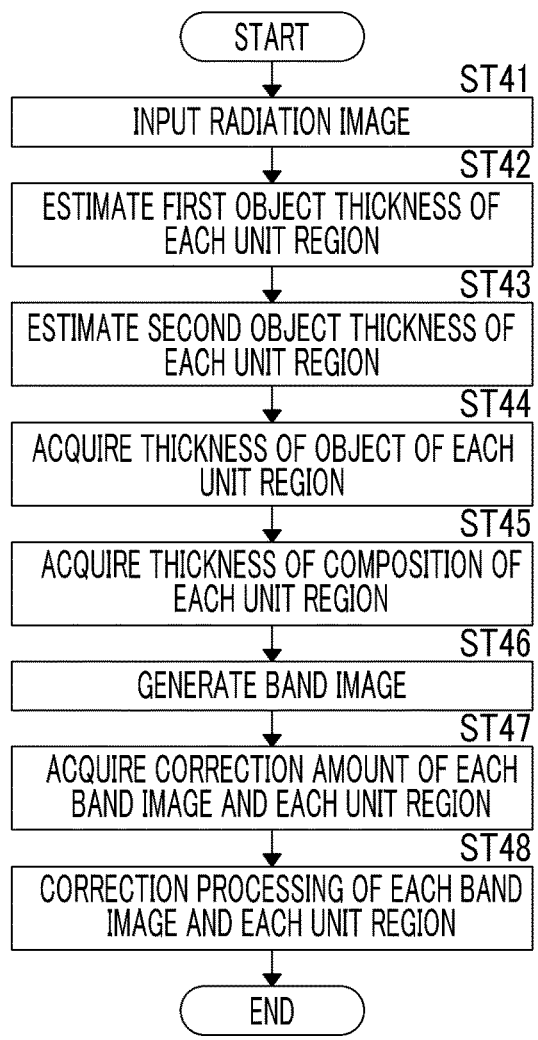
FIG. 13 is a flowchart showing processing which is performed in the fifth embodiment.
Figure 14:
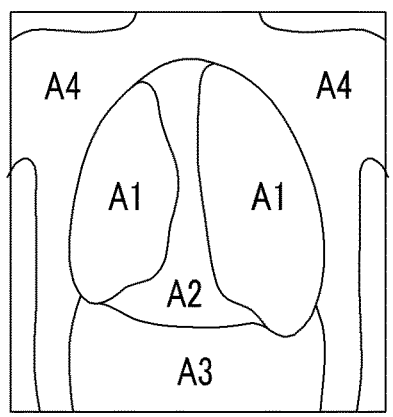
FIG. 14 is a diagram illustrating a problem to be solved by the invention.

Next, processing which is performed in the fifth embodiment will be described. FIG. 13 is a flowchart showing processing which is performed in the fifth embodiment. If the radiation image G acquired in the imaging device 1 is input to the computer 4 (Step ST41), for each unit region of the radiation image the first object thickness estimation unit 142 determines a value obtained by subtracting the distance between the X-ray source 3 and the surface of the object corresponding to the unit region from the distance between the X-ray source 3 and the radiation detector 5 as the first estimated thickness of the object corresponding to the unit region (Step ST42). For each unit region of the radiation image the second object thickness estimation unit 143 determines a value obtained by converting the pixel value representing the unit region to the thickness of the object by a predetermined conversion function as the second estimated thickness of the object corresponding to the unit region (Step ST43). For each unit region of the radiation image the object thickness acquisition unit 144 acquires the first estimated thickness determined in Step ST42 as the thickness of the object corresponding to the unit region (Step ST44). The processing of one of Steps ST42 and ST43 may be performed earlier, or the processing of Steps ST42 and ST43 may be performed in parallel. The processing of one of Steps ST43 and ST44 may be performed earlier, or the processing of Steps ST43 and ST44 may be performed in parallel.

Next, for each unit region of the radiation image the composition thickness acquisition unit 145 acquires the thickness of the specific composition corresponding to a combination of the tube voltage as at least one imaging condition affecting a radiation dose transmitted through the object M at the time of capturing the radiation image the thickness of the object acquired for the unit region in Step ST44, and a value obtained by subtracting the second estimated thickness determined in Step ST43 from the first estimated thickness determined in Step ST42 with reference to information indicating the second correspondence relationship R2 stored in the storage unit 148 (Step ST45).

Next, the frequency decomposition unit 550 performs frequency decomposition of the radiation image G to generate band images L0, L1, . . . representing the frequency components of a plurality of frequency bands (Step ST46), and, in the respective band images L1, L2, . . . , for the respective regions corresponding to the unit regions of the radiation image the correction amount acquisition unit 546 acquires a contrast correction amount corresponding to a combination of information representing the frequency band of the band image, the tube voltage as at least one imaging condition at the time of capturing the radiation image, the thickness of the object acquired for the unit region in Step ST44, and the thickness of the specific composition acquired in Step ST45 with reference to information indicating the fifth correspondence relationship R5 stored in the storage unit 548 (Step ST47).

Finally, for the respective regions of the band images L0, L1, . . . corresponding to the unit regions of the radiation image the correction processing unit 547 performs contrast correction using the contrast correction amount acquired in Step ST47, synthesizes all band images L10, L11, . . . after correction to generate a processed radiation image Gs (Step ST48), and ends the processing. The generated processed radiation image Gs (contrast-corrected radiation image) is displayed on the display unit 6 and provided for diagnosis, or is transmitted and saved to an external image server.

As described above, in the radiation imaging system of each of the first to fifth embodiments, information indicating the correspondence relationship of at least one imaging condition at the time of capturing the radiation image, the thickness of the object in the radiation exposure direction, the thickness of the specific composition in the radiation exposure direction included in the object, and the contrast correction amount is stored, in the radiation image captured by exposing the object to radiation, the thickness of the object at each position of the radiation image is acquired, in the radiation image, for each unit region where one or two or more pixels are included and the range of the maximum width of less than 2 cm of the object is imaged, the thickness of the specific composition included in the object corresponding to the unit region is acquired, for each unit region of the radiation image, the contrast correction amount corresponding to a combination of at least one imaging condition at the time of capturing the radiation image, the thickness of the object acquired for the unit region, and the thickness of the specific composition is acquired with reference to the stored information indicating the correspondence relationship, and for each unit region of the radiation image, contrast correction is performed using the contrast correction amount acquired for the unit region. For this reason, in the radiation image, for each unit region as a sufficiently small region, contrast correction can be performed in consideration of the thickness of the object corresponding to the region, the thickness of the specific composition included in the object, or the like. Therefore, sufficient image quality over the entire image can be secured.

In the second and third embodiments, the thickness of the specific composition of each unit region is acquired based on the radiation image and as described in the first embodiment, the measurement of the distance between the X-ray source 3 and the radiation detector 5 and the distance between the X-ray source 3 and the surface of the object corresponding to the unit region by an ultrasonic range finder or the like, and calculation processing using the measured values are not required; therefore, it is advantageous in that contrast correction can be performed in a shorter time than in the first embodiment. According to the first embodiment, as a result of contrast correction, an image with excellent image quality as the entire image tends to be obtained compared to the second and third embodiments.

In the fourth embodiment, the radiation image G is divided into the air containing region and other regions, and the thickness of the specific composition in each region is acquired by a method suitable for each divided region; therefore, as a result of contrast correction, an image with excellent image quality as the entire image tends to be obtained compared to the first to third embodiments.

In the fourth embodiment, although, for the air containing region, the thickness of the specific composition of each unit region is acquired by the method described in the second embodiment, the thickness of the specific composition of each unit region may be acquired by the method described in the third embodiment, instead of the method described in the second embodiment.

In the fourth embodiment, although the thickness of the specific composition of each unit region is acquired by the method described in the first embodiment, the thickness of the specific composition of each unit region may be acquired by the method described in the second, third, or fourth embodiment, instead of the method described in the first embodiment.

In the first, fourth, and fifth embodiments, although, in the radiation image for each unit region where the range of the maximum width of less than 2 cm of the object M is imaged, the second object thickness estimation unit 143 determines a value obtained by converting the pixel value representing the unit region to the thickness of the object by a predetermined conversion function as the second estimated thickness of the object corresponding to the unit region, alternatively, the radiation image G may be reduced to generate a reduced image within the range in which one pixel is less than 2 cm, and a value obtained by converting the pixel value of each pixel of the generated reduced image to the thickness of the object by a predetermined conversion function may be determined as the second estimated thickness of the object corresponding to the unit region of the radiation image G corresponding to the pixel.

In the second and third embodiments, although, in the radiation image for each unit region where the range of the maximum width of less than 2 cm of the object M is imaged, the object thickness acquisition unit 244 may acquire a value obtained by converting the pixel value representing the unit region to the thickness of the object by a predetermined conversion function as the thickness of the object corresponding to the unit region, alternatively, the radiation image G may be reduced to generate a reduced image within a range in which one pixel is less than 2 cm, and a value obtained by converting the pixel value of each pixel of the generated reduced image to the thickness of the object by a predetermined conversion function may be determined as the second estimated thickness of the object corresponding to the unit region of the radiation image G corresponding to the pixel. At this time, in the third embodiment, a low-resolution image with lower resolution than the reduced image from the reduced image can be generated, and the thickness of the specific composition can be acquired based on the difference between a value obtained by converting the pixel value of the reduced image to the thickness of the object by a conversion function and a value obtained by converting the pixel value of the low-resolution image generated from the reduced image to the thickness of the object by a conversion function.

In the first and fifth embodiments, although information indicating the first correspondence relationship R1 and information indicating the second correspondence relationship R2 are stored in the storage unit 248, the thickness distribution of the specific composition of each unit region is first acquired with reference to the second correspondence relationship R2, and the contrast correction amount of each unit region is next acquired with reference to the first correspondence relationship R1, alternatively, information indicating a sixth correspondence relationship obtained by combining the first correspondence relationship R1 and the second correspondence relationship R2, specifically, information indicating the correspondence relationship (sixth correspondence relationship) of at least one imaging condition at the time of capturing the radiation image, the thickness of the object, and a value obtained by subtracting a value obtained by converting the pixel value of the pixel with the object imaged on the radiation image to the thickness of the object by the conversion function from a value obtained by subtracting the distance between the radiation source and the object from the distance between the radiation source and the radiation detector, and the contrast correction amount may be stored in the storage unit 248, and for each unit region, a contrast correction amount corresponding to a combination of at least one imaging condition at the time of capturing the radiation image, the thickness of the object acquired for the unit region, and a value obtained by subtracting a value obtained by converting the pixel value of the pixel with the object imaged on the radiation image to the thickness of the object by the conversion function from a value obtained by subtracting the distance between the radiation source and the object from the distance between the radiation source and the radiation detector may be acquired with reference to the stored sixth correspondence relationship. With this, a step of acquiring the thickness distribution of the specific composition can be omitted.

The same applies to the second to fourth embodiments. Specifically, in the second embodiment, instead of information indicating the first correspondence relationship R1 and information indicating the third correspondence relationship R3, information indicating a seventh correspondence relationship obtained by combining these correspondence relationships can be stored in the storage unit 248, and the contrast correction amount of each unit region can be acquired with reference to information indicating the seventh correspondence relationship without acquiring the thickness distribution of the specific composition. In the third embodiment, instead of information indicating the first correspondence relationship R1 and information indicating the fourth correspondence relationship R4, information indicating an eighth correspondence relationship obtained by combining these correspondence relationships can be stored in the storage unit 248, and the contrast correction amount of each unit region can be acquired with reference to information indicating the eighth correspondence relationship without acquiring the thickness distribution of the specific composition.

In the fourth embodiment, instead of information indicating the first correspondence relationship R1, information indicating the second correspondence relationship R2, and information indicating the third correspondence relationship R3, information indicating a sixth correspondence relationship obtained by combining the first correspondence relationship R1 and the second correspondence relationship R2 and information indicating a seventh correspondence relationship obtained by combining the first correspondence relationship R1 and the third correspondence relationship R3 can be stored in the storage unit 448, and the contrast correction amount of each unit region can be acquired with reference to information indicating these correspondence relationships, without acquiring the thickness distribution of the specific composition.

What is claimed is:

1. A radiation image processing device comprising:
a correspondence relationship storage unit that stores information indicating the correspondence relationship of at least one imaging condition at the time of capturing a radiation image, the thickness of an object in a radiation exposure direction, the thickness of a specific composition in the radiation exposure direction included in the object, and a contrast correction amount;
a processor configured to
in a radiation image captured by exposing the object to radiation, for each unit region having one or two or more pixels, acquire the thickness of the object corresponding to the unit region,
in the radiation image, for each unit region of the radiation image, acquire the thickness of the specific composition included in the object corresponding to the unit region,
for each unit region of the radiation image, acquire a contrast correction amount corresponding to a combination of at least one imaging condition at the time of capturing the radiation image, the acquired thickness of the object of the unit region, and the thickness of the specific composition, with reference to the stored information indicating the correspondence relationship, and
for each unit region of the radiation image, perform contrast correction using the acquired contrast correction amount of the unit region; and
a frequency decomposition unit that performs frequency decomposition of the radiation image to generate a band image representing a frequency component of each of a plurality of frequency bands,
wherein the correspondence relationship storage unit stores information indicating the correspondence relationship of at least one imaging condition at the time of capturing the radiation image, the thickness of the object, the thickness of a specific composition included in the object, and a contrast correction amount to each band image generated by frequency-resolving the radiation image,
for each region corresponding to the unit region of each generated band image, the processor acquires a contrast correction amount to the band image corresponding to a combination of at least one imaging condition at the time of capturing the radiation image, the acquired thickness of the object for the unit region, and the thickness of a specific composition with reference to the stored information indicating the correspondence relationship, and
for each region corresponding to the unit region of each generated band image, the processor performs contrast correction using the acquired contrast correction amount for the region and synthesizes all band images after correction to generate a processed radiation image.

2. The radiation image processing device according to claim 1, further comprising:
wherein the processor further configured to
for each unit region of the radiation image, determine a value obtained by subtracting the distance between a radiation source and the object corresponding to the unit region from the distance between the radiation source and a radiation detector as a first estimated thickness of the object corresponding to the unit region,
for each unit region of the radiation image, determine a value obtained by converting a pixel value representing the unit region to the thickness of the object using a conversion function set in advance as a second estimated thickness of the object corresponding to the unit region, and
a second correspondence relationship storage unit that stores information indicating the second correspondence relationship of at least one imaging condition at the time of capturing a radiation image, the thickness of the object, a value obtained by subtracting a value obtained by converting a pixel value of a pixel with the object imaged on the radiation image to the thickness of the object by the conversion function from the value obtained by subtracting the distance between the radiation source and the object from the distance between the radiation source and the radiation detector, and the thickness of the specific composition included in the object,
wherein, for each unit region of the radiation image, the processor acquires one of the determined first estimated thickness and second estimated thickness as the thickness of the object corresponding to the unit region, and
for each unit region of the radiation image, the processor acquires the thickness of the specific composition corresponding to a combination of at least one imaging condition at the time of capturing the radiation image, the acquired thickness of the object of the unit region, and a value obtained by subtracting the second estimated thickness from the first estimated thickness determined for the unit region with reference to the stored information indicating the second correspondence relationship.

3. The radiation image processing device according to claim 1, further comprising:
a third correspondence relationship storage unit that stores information indicating the third correspondence relationship of at least one imaging condition at the time of capturing the radiation image, the thickness of the object, the difference in the thickness of the object estimated by the radiation images before and after smoothing, and the thickness of the specific composition included in the object; and wherein the processor smoothes the distribution of the thickness of the object acquired for each unit region to determine the thickness of the object of each unit region after smoothing, wherein, for each unit region of the radiation image, the processor acquires a value obtained by converting a pixel value representing the unit region to the thickness of the object by a conversion function set in advance as the thickness of the object corresponding to the unit region, and for each unit region of the radiation image, the processor acquires the thickness of the specific composition corresponding to a combination of at least one imaging condition at the time of capturing the radiation image, one of the thickness of the object in the unit region acquired by the processor and the thickness of the object in the unit region after smoothing determined by the processor, and a value obtained by subtracting the thickness of the object in the unit region after smoothing determined by the processor from the thickness of the object in the unit region acquired by the processor with reference to the stored information indicating the third correspondence relationship.

4. The radiation image processing device according to claim 1, further comprising:

a fourth correspondence relationship storage unit that stores information indicating the fourth correspondence relationship of at least one imaging condition at the time of capturing the radiation image, the thickness of the object, the difference in the thickness of the object estimated by the radiation images with different resolution, and the thickness of the specific composition included in the object; and wherein the processor generates a low-resolution image with lower resolution than the radiation image from the radiation image, and for each corresponding unit region corresponding to each unit region in the generated low-resolution image, acquires a value obtained by converting a pixel value representing the corresponding unit region to the thickness of the object by a conversion function set in advance as the thickness of the object corresponding to the corresponding unit region, wherein, for each unit region of the radiation image, the processor acquires a value obtained by converting a pixel value representing the unit region to the thickness of the object by the conversion function as the thickness of the object corresponding to the unit region, and for each unit region of the radiation image, the processor acquires the thickness of the specific composition corresponding to a combination of at least one imaging condition at the time of capturing the radiation image, one of the thickness of the object in the unit region acquired by the processor and the thickness of the object in the corresponding unit region corresponding to the unit region acquired by the processor, and a value obtained by subtracting the thickness of the object in the corresponding unit region corresponding to the unit region acquired by the processor from the thickness of the object in the unit region acquired by the processor with reference to the stored information indicating the fourth correspondence relationship.

5. The radiation image processing device according to claim 1, further comprising:

wherein the processor, for each unit region of the radiation image, determines a value obtained by subtracting the distance between a radiation source and the object corresponding to the unit region from the distance between the radiation source and a radiation detector as a first estimated thickness of the object corresponding to the unit region, wherein the processor, for each unit region of the radiation image, determines a value obtained by converting a pixel value representing the unit region to the thickness of the object by a conversion function set in advance as a second estimated thickness of the object corresponding to the unit region, a second correspondence relationship storage unit that stores information indicating the second correspondence relationship of at least one imaging condition at the time of capturing the radiation image, the thickness of the object, a value obtained by subtracting a value obtained by converting a pixel value of a pixel with the object imaged on the radiation image to the thickness of the object by the conversion function from the thickness of the object, and the thickness of the specific composition included in the object;

a third correspondence relationship storage unit that stores information indicating the third correspondence relationship of at least one imaging condition at the time of capturing the radiation image, the thickness of the object, and the difference in the thickness of the object estimated by the radiation images before and after smoothing, and the thickness of the specific composition included in the object;

a region specification unit that, in the radiation image, specifies an air containing region as a region with an object including an air region imaged; and wherein the processor smoothes the distribution of the thickness of the object acquired for each unit region by the processor to determine the thickness of the object of each unit region after smoothing, wherein, for each unit region of the radiation image, the processor acquires one of the determined first estimated thickness and second estimated thickness as the thickness of the object corresponding to the unit region, and (1) in the specified air containing region, for each unit region, the processor acquires the thickness of the specific composition corresponding to a combination of at least one imaging condition at the time of capturing the radiation image, one of the thickness of the object in the unit region acquired by the processor and the thickness of the object in the unit region after smoothing determined by the processor, and a value obtained by subtracting the thickness of the object in the unit region after smoothing determined by the processor from the thickness of the object in the unit region acquired by the processor with reference to the stored information indicating the third correspondence relationship, and (2) in a region other than the specified air containing region, for each unit region, the processor acquires the thickness of the specific composition corresponding to a combination of at least one imaging condition at the time of capturing the radiation image, the acquired thickness of the object of the unit region, and a value obtained by subtracting the second estimated thickness from the first estimated thickness determined for the unit region with reference to the stored information indicating the second correspondence relationship.

6. The radiation image processing device according to claim 1, further comprising:
  wherein the processor, for each unit region of the radiation image, determines a value obtained by subtracting the distance between a radiation source and the object corresponding to the unit region from the distance between the radiation source and a radiation detector as a first estimated thickness of the object corresponding to the unit region,
  wherein the processor, for each unit region of the radiation image, determines a value obtained by converting a pixel value representing the unit region to the thickness of the object by a conversion function set in advance as a second estimated thickness of the object corresponding to the unit region,
  a second correspondence relationship storage unit that stores information indicating the second correspondence relationship of at least one imaging condition at the time of capturing the radiation image, the thickness of the object, a value obtained by subtracting a value obtained by converting a pixel value of a pixel with the object imaged on the radiation image to the thickness of the object by the conversion function from the thickness of the object, and the thickness of the specific composition included in the object;
  a fourth correspondence relationship storage unit that stores information indicating the fourth correspondence relationship of at least one imaging condition at the time of capturing the radiation image, the thickness of the object, the difference in the thickness of the object estimated by the radiation images with different resolution, and the thickness of the specific composition included in the object;
  a region specification unit that, in the radiation image, specifies an air containing region as a region with an object including an air region imaged; and
  wherein the processor generates a low-resolution image with lower resolution than the radiation image from the radiation image, and for each corresponding unit region corresponding to each unit region in the generated low-resolution image, acquires a value obtained by converting a pixel value representing the corresponding unit region to the thickness of the object by the conversion function as the thickness of the object corresponding to the corresponding unit region,
  wherein, for each unit region of the radiation image, the processor acquires one of the determined first estimated thickness and second estimated thickness as the thickness of the object corresponding to the unit region, and
  (1) in the specified air containing region, for each unit region, the processor acquires the thickness of the specific composition corresponding to a combination of at least one imaging condition at the time of capturing the radiation image, one of the thickness of the object in the unit region acquired by the processor and the thickness of the object in the corresponding unit region corresponding to the unit region acquired by the processor, and a value obtained by subtracting the thickness of the object in the corresponding unit region corresponding to the unit region acquired by the processor from the thickness of the object in the unit region acquired by the processor with reference to the stored information indicating the fourth correspondence relationship, and
  (2) in a region other than the specified air containing region, for each unit region, the processor acquires the thickness of the specific composition corresponding to a combination of at least one imaging condition at the time of capturing the radiation image, the acquired thickness of the object of the unit region, and a value obtained by subtracting the second estimated thickness from the first estimated thickness determined for the unit region with reference to the stored information indicating the second correspondence relationship.

7. A radiation image processing method using the radiation image processing device, the method comprising:
  a step of acquiring information indicating the correspondence relationship from a correspondence relationship storage unit that stores information indicating the correspondence relationship of at least one imaging condition at the time of capturing a radiation image, the thickness of an object in a radiation exposure direction, the thickness of a specific composition in the radiation exposure direction included in the object, and a contrast correction amount;
  a step of, in a radiation image captured by exposing the object to radiation, for each unit region having one or two or more pixels, acquiring the thickness of the object corresponding to the unit region;
  a step of, in the radiation image, for each unit region of the radiation image, acquiring the thickness of the specific composition included in the object corresponding to the unit region;
  a step of, for each unit region of the radiation image, acquiring a contrast correction amount corresponding to a combination of at least one imaging condition at the time of capturing the radiation image, the acquired thickness of the object of the unit region, and the thickness of the specific composition with reference to the stored information indicating the correspondence relationship;
  a step of, for each unit region of the radiation image, performing contrast correction using the acquired contrast correction amount of the unit region; and
  a step of performing frequency decomposition of the radiation image to generate a band image representing a frequency component of each of a plurality of frequency bands,
  wherein the correspondence relationship storage unit stores information indicating the correspondence relationship of at least one imaging condition at the time of capturing the radiation image, the thickness of the object, the thickness of a specific composition included in the object, and a contrast correction amount to each band image generated by frequency-resolving the radiation image;
  a step of, for each region corresponding to the unit region of each generated band image, acquiring a contrast correction amount to the band image corresponding to a combination of at least one imaging condition at the time of capturing the radiation image, the acquired thickness of the object for the unit region, and the thickness of a specific composition with reference to the stored information indicating the correspondence relationship; and
  a step of, for each region corresponding to the unit region of each generated band image, performing contrast correction using the acquired contrast correction amount for the region and synthesizes all band images after correction to generate a processed radiation image.

8. A non-transitory computer-readable recording medium storing a radiation image processing program that causes a computer to function as the radiation image processing device and causes the computer to function as:

a correspondence relationship storage unit that stores information indicating the correspondence relationship of at least one imaging condition at the time of capturing the radiation image, the thickness of an object in a radiation exposure direction, the thickness of a specific composition in the radiation exposure direction included in the object, and a contrast correction amount;

a processor configured to in a radiation image captured by exposing the object to radiation, for each unit region having one or two or more pixels, acquire the thickness of the object corresponding to the unit region, in the radiation image, for each unit region of the radiation image, acquire the thickness of the specific composition included in the object corresponding to the unit region, for each unit region of the radiation image, acquire a contrast correction amount corresponding to a combination of at least one imaging condition at the time of capturing the radiation image, the acquired thickness of the object of the unit region, and the thickness of the specific composition with reference to the stored information indicating the correspondence relationship, and for each unit region of the radiation image, perform contrast correction using the acquired contrast correction amount of the unit region; and a frequency decomposition unit that performs frequency decomposition of the radiation image to generate a band image representing a frequency component of each of a plurality of frequency bands, wherein the correspondence relationship storage unit stores information indicating the correspondence relationship of at least one imaging condition at the time of capturing the radiation image, the thickness of the object, the thickness of a specific composition included in the object, and a contrast correction amount to each band image generated by frequency-resolving the radiation image, for each region corresponding to the unit region of each generated band image, the processor acquires a contrast correction amount to the band image corresponding to a combination of at least one imaging condition at the time of capturing the radiation image, the acquired thickness of the object for the unit region, and the thickness of a specific composition with reference to the stored information indicating the correspondence relationship, and for each region corresponding to the unit region of each generated band image, the processor performs contrast correction using the acquired contrast correction amount for the region and synthesizes all band images after correction to generate a processed radiation image.

* * * * *